United States Patent
Ohtsuki et al.

(10) Patent No.: US 6,477,282 B1
(45) Date of Patent: Nov. 5, 2002

(54) IMAGE FORMING DEVICE

(75) Inventors: Masaaki Ohtsuki, Yamatokoriyama; Mitsuru Tokuyama, Soraku-gun; Mihoko Tanimura, Nara; Masatsugu Nakamura, Kashiba, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/213,083

(22) Filed: Dec. 16, 1998

(30) Foreign Application Priority Data

Dec. 16, 1997 (JP) .............................. 9-346890

(51) Int. Cl.[7] ................................. G06K 9/32
(52) U.S. Cl. ....................... 382/266; 382/298
(58) Field of Search ............... 382/266–269, 382/199, 298–301; 358/1.2

(56) References Cited

U.S. PATENT DOCUMENTS

| | | | | |
|---|---|---|---|---|
| 4,984,157 A | * | 1/1991 | Cline et al. | 364/413.13 |
| 5,489,952 A | * | 2/1996 | Gove et al. | 348/711 |
| 5,754,710 A | * | 5/1998 | Sekine et al. | 382/300 |
| 5,768,432 A | * | 6/1998 | Schweld | 382/237 |
| 5,838,371 A | * | 11/1998 | Hirose et al. | 348/240 |

FOREIGN PATENT DOCUMENTS

JP    8167996/1996    6/1996

* cited by examiner

*Primary Examiner*—Thomas D. Lee
*Assistant Examiner*—Stephen Brinich
(74) *Attorney, Agent, or Firm*—Dike Bronstein, Roberts & Cushman IP Group Edwards & Angell, LLP; David G. Conlin; Timothy Carter Pledger

(57) ABSTRACT

The image forming device according to the present invention performs resolution conversion processing or scaling processing of a binary image and outputs a processed image. The present image forming device is provided with an edge detecting section, which, during resolution conversion or scaling of the binary image, detects edges of the image and detects lengths and shapes of the edges, and with an interpolated/skipped line producing section, which performs resolution conversion processing or scaling processing based on the lengths and shapes of edges detected by the edge detecting section.

23 Claims, 27 Drawing Sheets

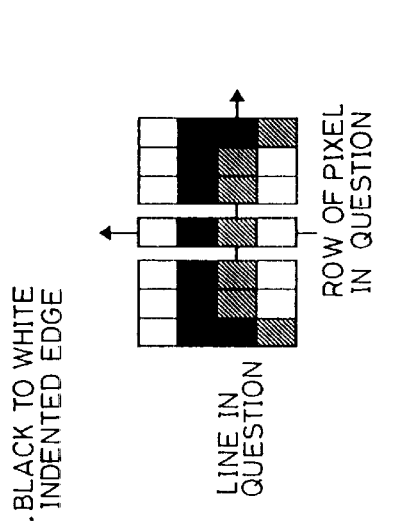
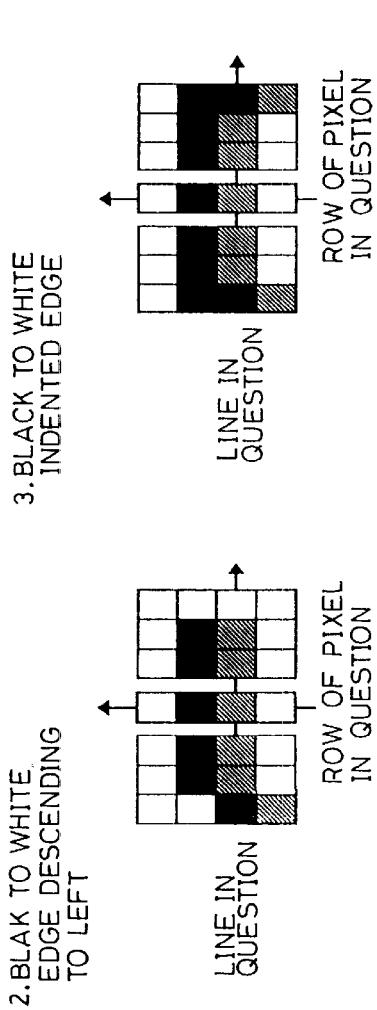
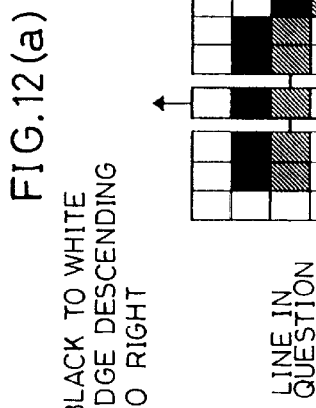
FIG.12(a) 1. BLACK TO WHITE EDGE DESCENDING TO RIGHT
FIG.12(b) 2. BLACK TO WHITE EDGE DESCENDING TO LEFT
FIG.12(c) 3. BLACK TO WHITE INDENTED EDGE

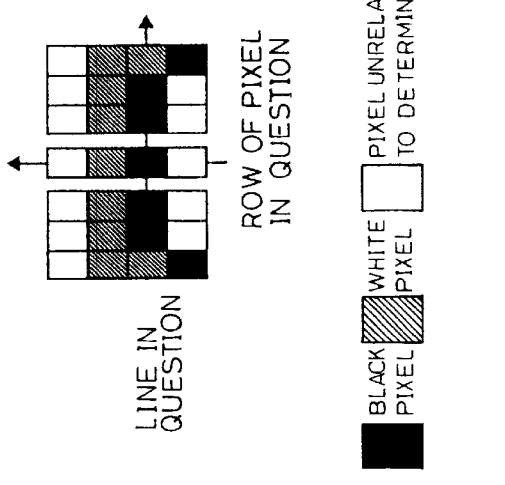
FIG. 12(f) 6. WHITE TO BLACK INDENTED EDGE
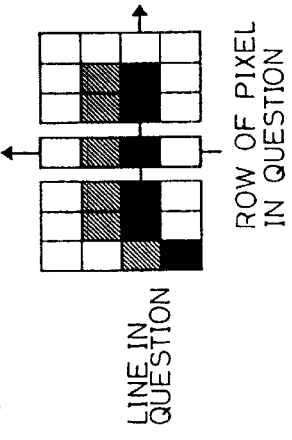
FIG. 12(e) 5. WHITE TO BLACK EDGE DESCENDING TO LEFT
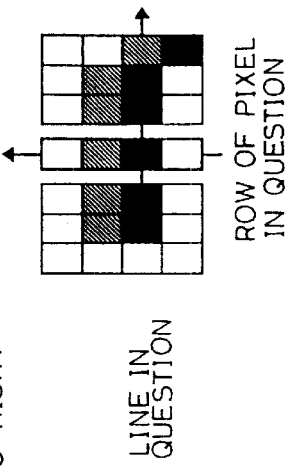
FIG. 12(d) 4. WHITE TO BLACK EDGE DESCENDING TO RIGHT

FIG.27(a) INPUT PATTERN
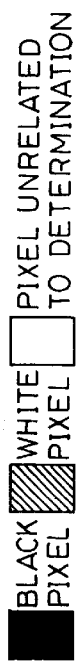
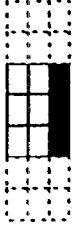
FIG.27(b) EXPANSION OF REFERENCE AREA
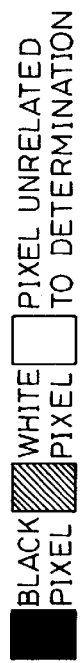
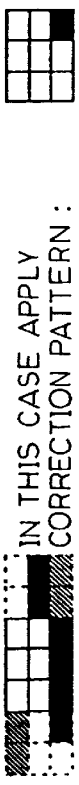
FIG.27(c) IN THIS CASE APPLY CORRECTION PATTERN :
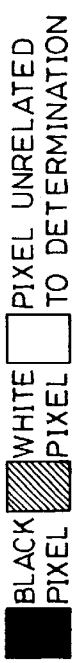
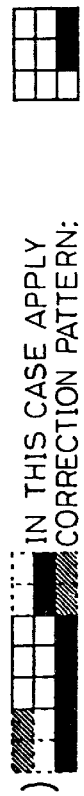
FIG.27(d) IN THIS CASE APPLY CORRECTION PATTERN:

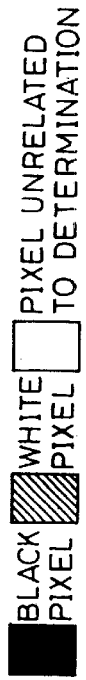
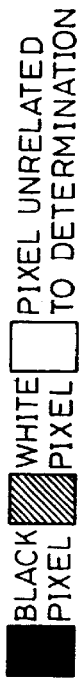
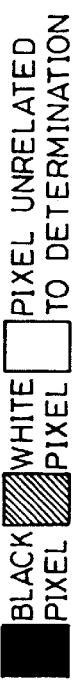
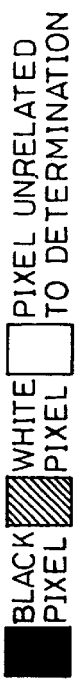
FIG.28(a) INPUT PATTERN
FIG.28(b) EXPANSION OF REFERENCE AREA
FIG.28(c) IN THIS CASE APPLY CORRECTION PATTERN:
FIG.28(d) IN THIS CASE APPLY CORRECTION PATTERN:

FIG.29(a)
| 1 | 1 | 0 | 0 | 0 | 0 | 0 | 0 | 0 | 0 |
|---|---|---|---|---|---|---|---|---|---|
| 1 | 1 | 1 | 1 | 1 | 0 | 0 | 0 | 0 | 0 |
| 1 | 1 | 1 | 1 | 1 | 1 | 1 | 1 | 1 | 1 |
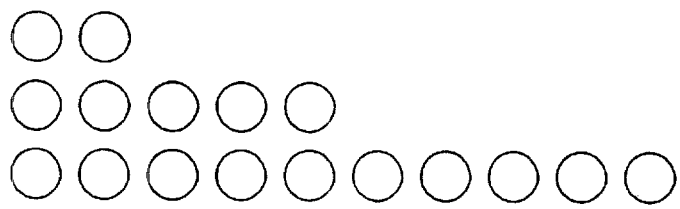
FIG.29(b)
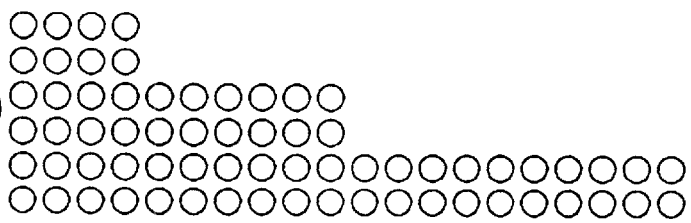
FIG.29(c)

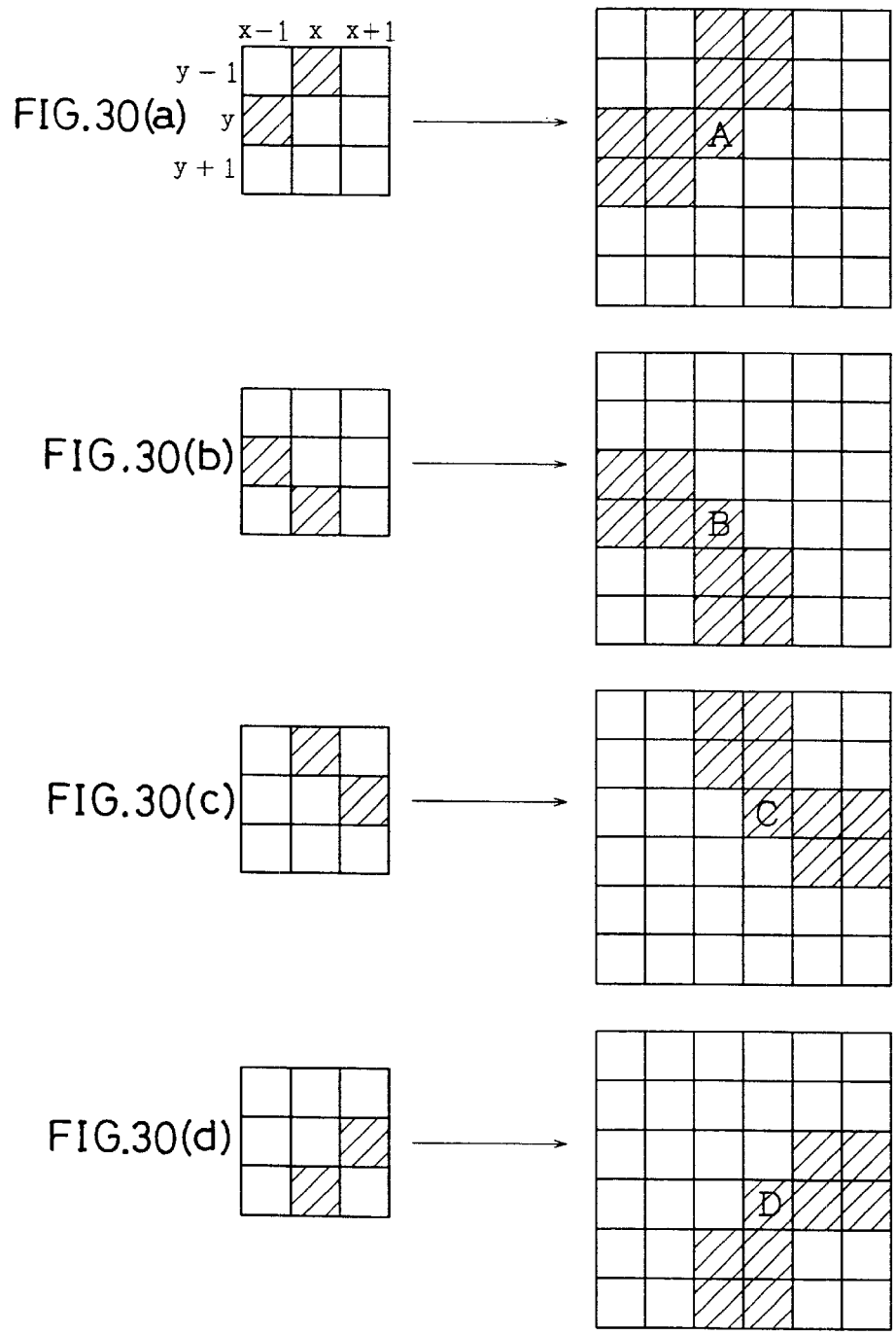

IMAGE FORMING DEVICE

FIELD OF THE INVENTION

The present invention relates to an image forming device, such as a digital copy machine, facsimile device, or scanner device, which performs resolution conversion processing or scaling processing of a binary image and outputs a processed image.

BACKGROUND OF THE INVENTION

In image forming devices such as digital copy machines, facsimile devices, and scanner devices, inputted images of written characters, etc. often undergo enlargement processing, resolution conversion, etc.

Conventionally, when performing binary resolution conversion or scaling, the method generally used was simply to increase the number of or selectively skip pixels. The advantage of this method was that the necessary hardware could be easily realized.

Binary, i.e. one-bit image data was generally expressed as shown in FIG. 29(a), and when outputted by a hard copy device, etc., this data was outputted as shown in FIG. 29(b).

In order to simply magnify by two times, data was interpolated to obtain four times the data quantity of FIG. 29(b), yielding output data shown in FIG. 29(c). In the case shown in FIG. 29(c), the dot diameter of the hard copy device is reduced by half, and the dot density is increased by four times.

If, on the other hand, the dot diameter of the hard copy device is the same as that in FIG. 29(b), the image is outputted enlarged by two times. Accordingly, the dot diameter of the hard copy device determines whether resolution conversion or scaling is performed.

However, merely enlarging, etc., a binary image using this method gives rise to fixed patterns, stripes, etc. such as the display of edges of written characters, etc. as rough, stair-step shapes. Thus, from the point of view of the outputted image, this method produced very unattractive images.

For this reason, in order to display such rough edges more smoothly, processing called smoothing has recently been adopted. One example of smoothing is the enlarged character correction method disclosed in Japanese Unexamined Patent Publication No. 63-172:664/1988 (Tokukaisho 63-172664).

The foregoing conventional art is a method of enlarging a standard character pattern by two times vertically and horizontally. As shown in FIGS. 30(a) through 30(d), when a predetermined pattern of 3×3 pixels is detected, a corresponding correction pattern is calculated using a certain computing formula.

However, the foregoing conventional correction method only enlarges two times vertically and horizontally, and is only able to detect small patterns of 3×3 pixels. Thus inclined lines of shallow angle, for example, cannot be detected as other than horizontal lines, and smoothing correction cannot be performed over a wide extent.

SUMMARY OF THE INVENTION

It is an object of the present invention to provide a low cost image forming device capable of performing resolution conversion or scaling processing of high image quality, which enables smoothing correction of, in particular, inclined lines of shallow angle, such as gradually inclined images.

In order to attain the foregoing object, an image forming device according to the present invention includes an edge detecting section, which detects length and shape of an edge of a binary image; and an interpolating section, which, based on the length and shape of the edge detected by the edge detecting section, performs resolution conversion processing or scaling processing of the binary image.

With the foregoing structure, when forming an image by resolution conversion or scaling of a binary image, the edge detecting section detects the length and shape of the edge. An edge is an area of change from black to white pixels or from white to black pixels, and accordingly the length and shape of an edge can be grasped on a pixel-by-pixel basis. For this reason, the edge detecting section can detect the incline of a line of shallow angle.

Then, since the interpolating section performs resolution conversion processing or scaling processing on the basis of the length and shape of the edge detected by the edge detecting section, pixels can be interpolated at optimum positions.

As a result, it is possible to provide an image forming device of low cost, capable of performing resolution conversion or scaling processing of high image quality, which enables smoothing correction of, in particular, inclined lines of shallow angle, such as gradually inclined images.

In order to attain the foregoing object, an image forming device according to the present invention may also include an edge detecting section, which detects an edge of a binary image, and detects length and shape of the edge; an interpolating section, which, based on the length and shape of the edge detected by the edge detecting section, performs resolution conversion processing or scaling processing of the binary image; a pattern mask section, which performs resolution conversion processing or scaling processing by means of a pattern matching mask; and a combining section, which combines the resolution conversion processing or scaling processing performed by the interpolating section and the resolution conversion processing or scaling processing performed by the pattern mask section.

With the foregoing structure, the method of resolution conversion processing or scaling processing by detection of length and shape of an edge, performed by the edge detecting section and the interpolating section, is combined, by the combining section, with resolution conversion processing or scaling processing using a pattern matching mask, performed by the pattern mask section. Consequently, a wide range of resolution conversion rates or scaling rates can be used.

As a result, even finer edges can be made smooth.

Additional objects, features, and strengths of the present invention will be made clear by the description below. Further, the advantages of the present invention will be evident from the following explanation in reference to the drawings.

BRIEF DESCRIPTION OF THE DRAWINGS

FIGS. 12(a) through 12(f) are explanatory drawings showing edges in the foregoing resolution conversion or scaling, FIG. 12(a) showing the shape of an edge between black pixels and white pixels which descends to the right, FIG. 12(b) the shape of an edge between black pixels and white pixels which descends to the left, FIG. 12(c) the shape of an indented edge between black pixels and white pixels, FIG. 12(d) the shape of an edge between white pixels and black pixels which descends to the right, FIG. 12(e) the shape of an edge between white pixels and black pixels which descends to the left, and FIG. 12(f) the shape of an indented edge between white pixels and black pixels.

FIGS. 27(a) through 27(d) are explanatory drawings showing, in the foregoing pattern matching resolution conversion section, a method of referring to a mask of 7×3 pixels made up of basic input pattern No. 5 combined with adjacent areas of 2×3 pixels to the left and right in the primary scanning direction, i.e., a method of resolution conversion or scaling by expansion of a reference area, with FIG. 27(a) showing the input pattern, FIG. 27(b) showing expansion of the reference area, FIG. 27(c) showing, in the drawing on the right, a correction pattern to be applied in the case of the drawing on the left, and FIG. 27(d) showing, in the drawing on the right, a correction pattern to be applied in the case of the drawing on the left.

FIGS. 28(a) through 28(d) are explanatory drawings showing, in the foregoing pattern matching resolution conversion section, a method of referring to a mask of 7×3 pixels made up of basic input pattern No. 28 combined with adjacent areas of 2×3 pixels to the left and right in the primary scanning direction, i.e., a method of resolution conversion or scaling by expansion of the reference area, with FIG. 28(a) showing the input pattern, FIG. 28(b) showing expansion of the reference area, FIG. 28(c) showing, in the drawing on the right, a correction pattern to be applied in the case of the drawing on the left, and FIG. 28(d) showing, in the drawing on the right, a correction pattern to be applied in the case of the drawing on the left.

FIGS. 29(a) through 29(c) are explanatory drawings showing a conventional resolution conversion or scaling method, FIG. 29(a) showing a form for expressing binary image data, FIG. 29(b) showing the state in which the foregoing binary image data is outputted, and FIG. 29(c) showing the state of output when the foregoing binary image data is simply magnified by two times.

FIGS. 30(a) through 30(d) are explanatory drawings showing a method of resolution conversion or scaling by conventional smoothing processing, FIG. 30(a) showing smoothing of an upper left edge, FIG. 30(b) smoothing of a lower left edge, FIG. 30(c) smoothing of an upper right edge, and FIG. 30(d) smoothing of a lower right edge.

DESCRIPTION OF THE EMBODIMENTS

First Embodiment

The following will explain one embodiment of the present invention with reference to FIGS. 1 through 18.

A digital copy machine 30, which is the image forming device of the present embodiment, is a combined. device provided with, for example, a facsimile function, and includes peripheral devices such as a post-processing device, etc.

Figure 2:
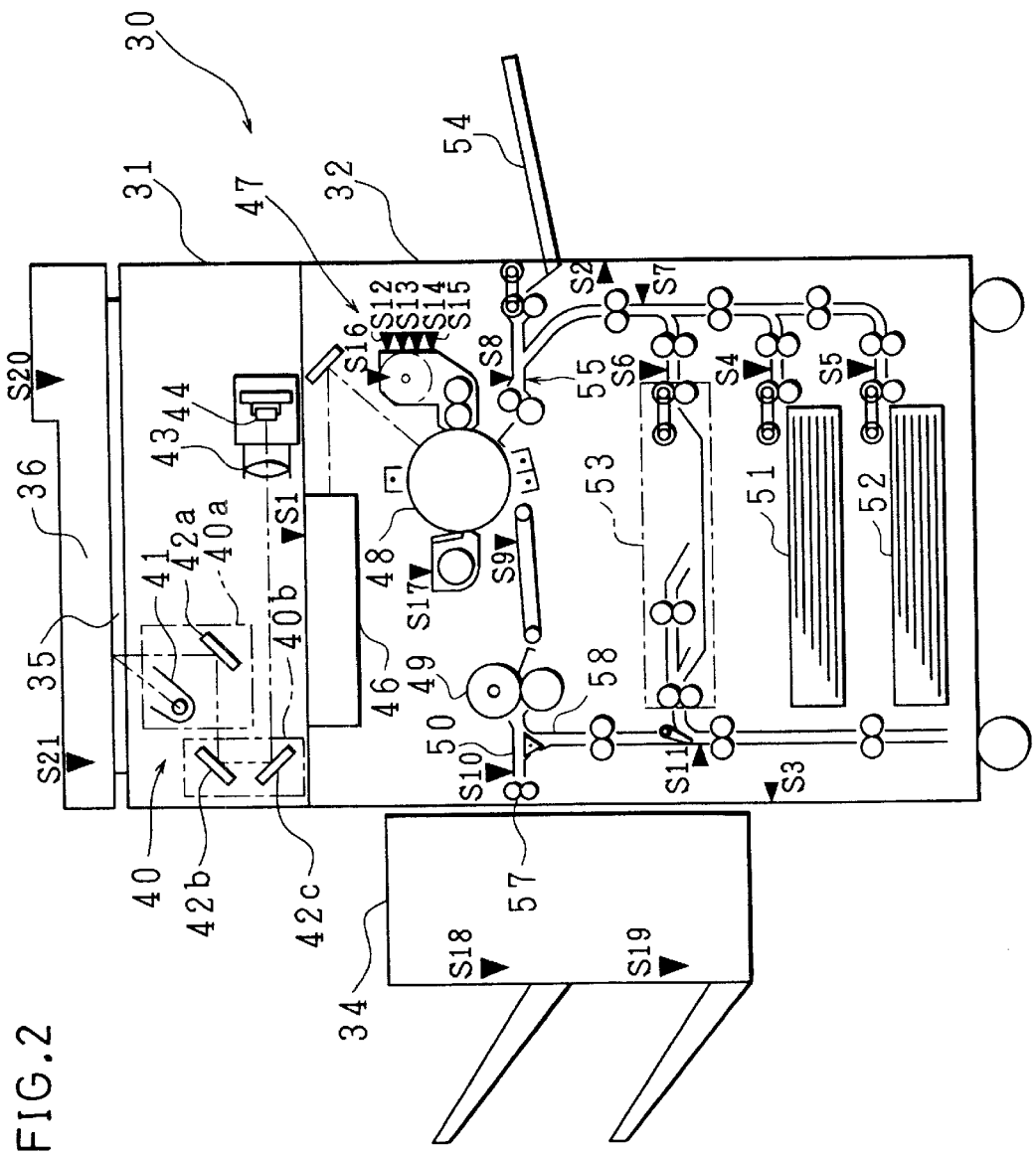
FIG. 2 is a drawing showing the overall structure of a digital copy machine according to one embodiment of the present invention.

As shown in FIG. 2, the digital copy machine 30 is broadly divided into a scanner section 31 and a laser printer section 32.

The scanner section 31 is made up of an original placement stand 35 made of transparent glass; an RADF (Recirculating Automatic Document Feeder) 36 able to handle double-sided original documents, for automatically supplying and transporting an original document to the top of the original placement stand 35; and an original image scanning unit, i.e., a scanner unit 40, for reading an original image by scanning an original document positioned on the original placement stand 35.

The scanner section 31 scans an image from an original document on the original document stand 35.

The RADF 36 is a device which automatically supplies to the top of the original placement stand 35 of the scanner section 31 one sheet at a time from a plurality of original documents placed in an original tray (not shown). Further, the RADF 36 is made up of a transport channel for single-sided originals, a transport channel for double-sided originals, transport channel switching means, etc., and allows the scanner unit 40 to scan one or both sides of the original according to a selection of the user. In the past, many devices similar to the RADF 36 have been patented or commercially marketed, and accordingly, further explanation of the RADF 36 will be omitted. Incidentally, the RADF 36 is not necessarily required, and a simple ADF (Automatic Document Feeder) may be provided instead.

The scanner unit 40, included in the scanner section 31, is made up of a first scanning unit 40a, which includes a lamp reflector assembly 41 for projecting light onto the surface of the original, and a first reflector mirror 42a for reflecting light reflected from the original so as to direct the light toward a CCD (Charge Coupled Device) 44 (an element for photoelectric conversion of a reflected light image from the original); a second scanning unit 40b, which includes second and third reflector mirrors 42b and 42c for directing the reflected light image from the original, reflected by the first reflector mirror 42a, toward the CCD element 44; an optical lens 43, which focuses on the CCD element 44 the reflected light image reflected from the original via the reflector mirrors 42a, 42b, and 42c; and the CCD element 44, which converts the reflected light image from the original into electrical image signals.

The scanner section 31 is structured so that the RADF 36 and the scanner unit 40 operate in concert, the RADF 36 successively placing each original document to be scanned on the original placement stand 35, and the scanner unit 40 reading the image of each original so placed by moving along the underside of the original placement stand 35.

Image data obtained by reading the original image using the scanner unit 40 is sent to an image processing section (to be discussed below), where it undergoes various image processing. Thereafter, the image data in the memory is sent to an LSU (Laser Scanner Unit) 46 of the laser printer section 32, is recreated as a visible image on a photoreceptor drum 48 by means of the electrophotographic process, and an image is then formed on paper.

The laser printer section 32 includes a transport system for sheets of paper, on which images are formed; the LSU 46; and a process section 47 for forming images by means of the electrophotographic process.

The LSU 46 includes a semiconductor laser light source, a polygon mirror, an f-θ lens, etc. (not shown). The semiconductor laser light source projects laser light in accordance with image data read out from memory (image data read by the scanner unit 40 and stored in memory), or image data transferred from an external device. The laser light is deflected with equal angular velocity by the polygon mirror, and corrected by the f-θ lens so that it is deflected with equal angular velocity onto the photoreceptor drum 48 of the process section 47.

The process section 47 is made up of known devices, and includes a charger, a developer, a transfer device, a sheet separator, a cleaning device, a charge eliminator, etc., arranged around the circumference of the photoreceptor drum 48.

The transport system for sheets of paper includes a transport channel 55, which transports the sheets of paper to a transfer position of the process section 47, where the transfer device is provided; a first cassette 51, a second cassette 52, and a multi-handfeed tray 54, which send sheets of paper into the transport channel 55; a fixing device 49 for fixing onto sheets of paper images, specifically toner images, transferred thereto; a paper discharge/transport channel 50 provided in the downstream transport direction from the fixing device 49, which leads to a transport channel 57 leading to a finisher 34, and to a switchback transport channel 58 from which branches a double-sided copying unit 53; and the double-sided copying unit 53, which re-supplies sheets of paper after fixing, so that images may be formed on the reverse sides thereof.

Stacks of paper are stored by size in the first and second cassettes 51 and 52. When the operator selects a cassette containing paper of a desired size, paper is sent, one sheet at a time from the top of the stack, and transported through the transport channel 55 toward the image forming section of the laser printer section 32.

In the laser printer section 32, the LSU 46, by scanning the surface of the photoreceptor drum 48 with laser light, forms an electrostatic latent image of the image data read out from the image memory. Toner then makes the electrostatic latent image on the surface of the photoreceptor drum 48 visible as a toner image, which is electrostatically transferred and fixed to the surface of a sheet of paper transported from the first cassette 51, the second cassette 52, etc.

A sheet of paper on which an image has been formed in this way is, from the fixing device 49, selectively transported to the finisher 34 via the transport channels 50 and 57, to the double-sided copying unit 53 via the transport channel 50 and the switchback transport channel 58, etc.

The finisher 34 receives sheets of paper on which the digital copy machine 30 has formed images, performs post-processing thereof such as stapling, folding, hole punching, etc., and discharges the post-processed sheets to a suitable discharge tray as final copies.

A plurality of sensors are provided at necessary points within the digital copy machine 30. These sensors include sensors which check whether a front panel, side panel, etc. (which may be opened to check the interior of the digital copy machine 30; not shown) are open or closed, sensors which check whether sheets of paper in the transport channels are being transported in a predetermined manner, sensors which check whether certain units are actually installed in the digital copy machine 30, and whether those units are operating correctly, etc.

Further, the interior of the finisher 34 is also provided with sensors which check whether sheets are being post-processed correctly by the various processing sections thereof.

To briefly explain the various sensors, first, in the digital copy machine 30, sensor S1 detects whether the front panel is open or closed, sensor S2 detects whether a vertical paper transport channel of the digital copy machine 30 is open or closed, and sensor 3 detects whether the switchback transport channel 58 of the digital copy machine 30 is open or closed.

Sensors S4 and S5 check whether a sheet of paper has been supplied from the first and second cassettes 51 and 52, respectively, sensor S6 checks whether a sheet has been re-supplied from the double-sided copying unit 53, and sensor S7 is a sensor for a transport channel 55 which transports sheets from the first cassette 51, the second cassette 52, and the double-sided copying unit 53 toward the process section 47. Sensor S8 is a resist sensor, sensor S9 checks for separation failure at the time of sheet separation after transfer, sensor S10 is a discharge sensor, and sensor S11 is a sensor for the switchback transport channel 58.

Next, sensors S12, S13, S14, and S15 check, from the ON/OFF combination thereof, the type of developing device installed, sensor S16 checks the supply of developing agent, and sensor S17 detects whether a cleaning waste toner container is installed, and whether it is full.

In the finisher 34, sensors S18 and S19 check whether sheets have been post-processed correctly by the various processing sections thereof.

Further, sensors S20 and S21 check the state of transport of sheets in the RADF 36.

Additional sensors may be provided as necessary. The ON/OFF states of the sensors S1 through S21 are constantly managed by a machine control board 200, to be discussed below, which manages the entirety of the digital copy machine 30. During execution of a predetermined sequence program, if the sensors S1 through S21 are not in predetermined states, an error is detected, and processing switches to a trouble processing routine.

The following will explain the structure and functions of an image processing section of the digital copy machine 30, which performs image processing of read original image data.

Figure 3:
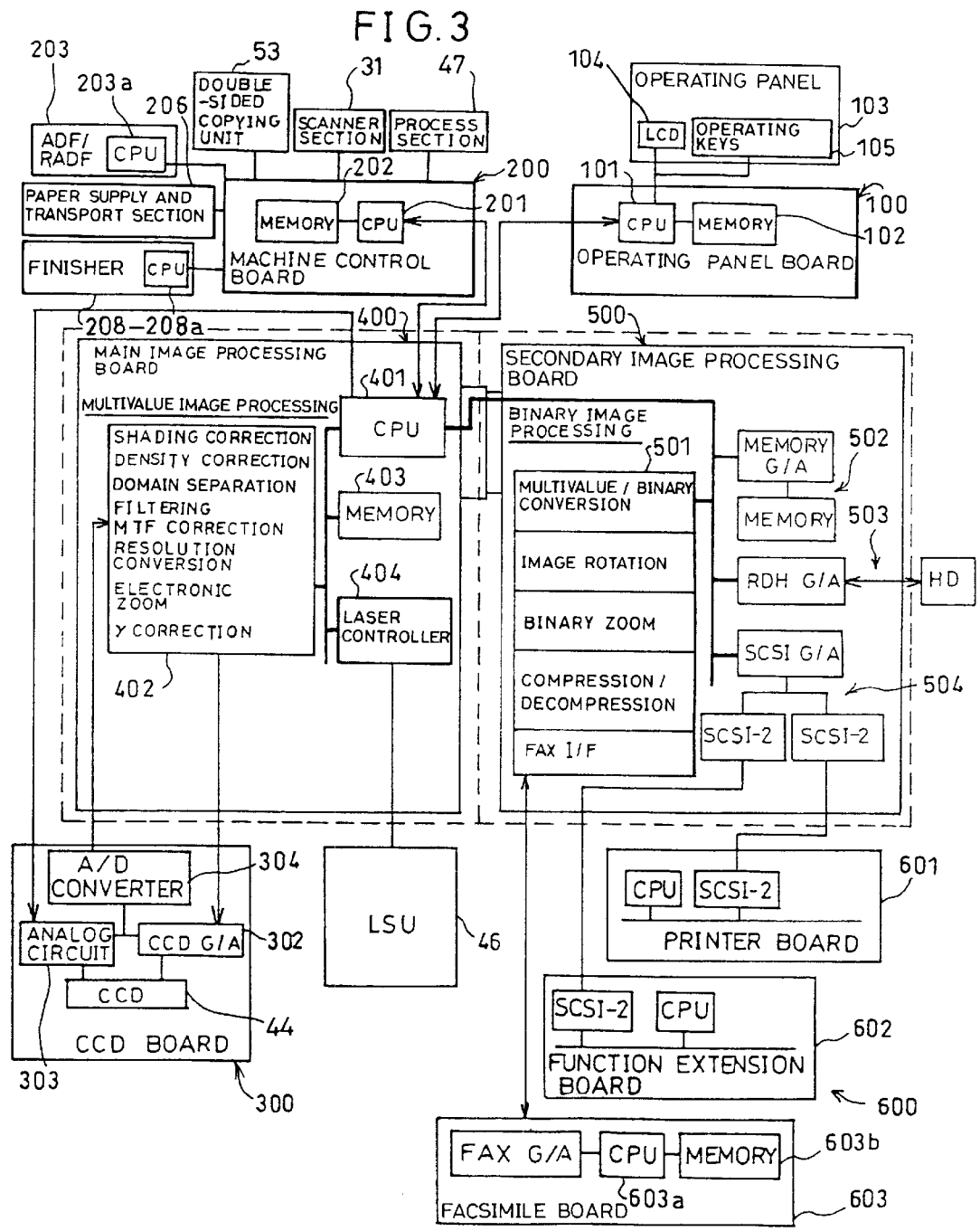
FIG. 3 is a block diagram showing an image processing section of the foregoing digital copy machine.

As shown in the block diagram in FIG. 3, the image processing section controls the operations of the digital copy machine 30 by means of a main CPU (Central Processing Unit) 401, shown substantially at the center of the Figure, in cooperation with secondary CPUs provided in the various units making up the digital copy machine 30.

As can be seen from the block diagram in FIG. 3, the image processing section is made up of an operating panel board 100, shown substantially in the upper right corner of the Figure; a machine control board 200, shown substantially in the upper left corner of the Figure; a CCD board 300, shown substantially in the lower left corner of the Figure; a main image processing board 400 and a secondary image processing board 500, shown substantially at the center of the Figure; a group of expansion boards 600 (for example, a printer board, a facsimile board, a function expansion board, etc.), shown substantially in the lower right corner of the Figure, etc.

The operating panel board 100 manages and controls an operating panel 103. The machine control board 200 manages and controls the various units making up the digital copy machine 30. The CCD board 300 electrically reads an original image and converts it into electronic data. The main image processing board 400 performs predetermined image processing of original images converted into electronic data by the CCD board 300. The secondary image processing board 500 performs predetermined image processing of image data processed by the main image processing board 400. The group of expansion boards 600 are connected to the secondary image processing board 500 via an interface.

The following will explain the management and control exercised by each of the foregoing boards.

First, the operating panel board 100 is chiefly controlled by a secondary CPU 101, and manages (i) a display screen of an LCD (Liquid Crystal Display) display section 104 provided on the operating panel 103; (ii) operations inputted through operating keys 105 used for inputting instructions regarding the various modes; etc. The operating panel board 100 is also provided with a memory 102 for storing various control information of the operating panel 103, such as data inputted through the operating keys 105 and information displayed on the screen of the LCD display section 104.

In the operating panel board 100, the secondary CPU 101 performs control data communication with the main CPU 401, and gives operating instructions to the digital copy machine 30. Further, control signals showing the operating status of the digital copy machine 30 are sent from the main CPU 401 to the secondary CPU 101. By this means, the LCD display section 104 of the operating panel 103 is enabled to display the operating status in order to inform the user of the current status of the device.

Next, the machine control board 200 is controlled by a secondary CPU 201, and manages devices such as an automatic document feeding device 203 (such as the RADF 36, an ADF, etc.); the scanner section 31 for reading an original image; the process section 47 for recreating the image data as an image; a paper supply and transport section 206, which successively supplies paper on which images are to be recorded from a storage section to the process section 47; the double-sided copying unit 53, which turns over and transports paper with an image formed thereon, so that images can be formed on both sides thereof; the finisher 208, which performs post-processing, such as stapling, of paper with images formed thereon, etc.

The automatic document feeding device 203 (the RADF 36, an ADF, etc.) and the finisher 208 (which performs post-processing such as stapling of paper with images formed thereof) are provided with secondary CPUs 203a and 208a, respectively, which control the respective devices. The secondary CPUs 203a and 208a are in communication with the main CPU 401, the secondary CPU 101 of the operating panel board 100, and the secondary CPU 201 of the machine control board 200. The operations of the automatic document feeding device 203 and the finisher 34 are performed in concert with those of the other units of the digital copy machine 30.

Next, the CCD board 300 is made up of the CCD 44, a CCD gate array (CCD G/A) 302, an analog circuit 303, an A/D converter 304, etc., and is controlled and managed by the main CPU 401.

The CCD 44 is for electrically reading an original image. The CCD gate array 302 is a circuit for driving the CCD 44. The analog circuit 303 performs gain adjustment, etc. of analog data outputted from the CCD 44. The A/D converter 304 converts the analog output of the CCD 301 to digital signals, which are outputted as electronic data.

The main image processing board 400 is made up of a multivalue image processing section 402, a memory 403, a laser controller 404, etc., and is controlled by the main CPU 401.

The multivalue image processing section 402, so that gray-scale shading of the image can be expressed as desired, performs processing such as shading correction, density correction, region separation, filtering, MTF (Modulation Transfer Function) correction, resolution conversion, electronic zoom (scaling processing), and gamma (γ) correction of original image electronic data sent from the CCD board 300 while it is still in the form of multivalue image data. The memory 403 stores processed image data and/or various control information such as management of the steps of processing. The laser controller 404 sends data to and controls the LSU 46 in order to recreate an image from processed image data.

Next, the secondary image processing board 500 is made up of a binary image processing section 501, a memory gate array (memory G/A) 502, a hard disk gate array (RDH G/A) 503, an interface gate array (SCSI G/A) 504, etc.

The binary image processing section 501 is connected to the main image processing board 400 via connectors 405 and 505, and is controlled by the main CPU 401. of the main image processing board 400. The memory gate array 502 controls a memory which stores and manages binary image data which has been image-processed by the binary image processing section 501 and/or control information in processing. The hard disk array 503 controls a hard disk (HD) which stores and manages image data for a plurality of original images, and from which the image data for the plurality of original images is read out a plurality of times in order to produce a desired number of copies. The interface gate array (SCSI G/A) 504 controls SCSIs, which are external interfaces.

The binary image processing section 501 is made up of a multivalue/binary conversion section which converts multivalue image data to binary image data, an image rotation processing section which rotates images, a binary scaling (zoom) processing section which performs scaling processing of binary images, a compression/expansion section which performs compression and expansion of images, etc., and, to enable sending and receiving of facsimile images through transmission means, is also provided with a facsimile interface (FAX I/F).

The expansion boards 600 include a printer board 601, a function expansion board 602, a facsimile board 603, etc.

The printer board 601 enables the laser printer section 32 of the digital copy machine 30 to output, in printer mode, data sent from a personal computer, etc. The function expansion board 602 expands the editing functions of the digital copy machine 30 and enables effective utilization of its properties. The facsimile board 603 enables original images read by the scanner section 31 of the digital copy machine 30 to be transmitted as facsimile images, and received facsimile images to be outputted by the laser printer section 32 of the digital copy machine 30, etc.

The following will explain in detail the processing and flow of image data in copy mode, facsimile mode, and printer mode of the digital copy machine 30 (image processing device).

COPY MODE

Original documents placed in a predetermined location of the RADF 36 of the digital copy machine 30 are successively supplied, one sheet at a time, to the top of the original placement stand 35 of the scanner section 31, and original images successively read by means of the structure of the scanner unit 40 explained above are sent as 8-bit electronic data to the main image processing board 400.

The 8-bit electronic data sent to the main image processing board 400 undergoes predetermined processing in the multivalue image processing section 402 as 8-bit electronic image data.

Then, the 8-bit electronic image data undergoes processing such as gamma correction, and is sent to the LSU 46 via the laser controller 404. In this way, the original image read by the scanner section 31 of the digital copy machine 30 is outputted from the laser printer section 32 as a copy image having gray-scale shading.

ELECTRONIC RDH FUNCTION IN COPY MODE

In the same manner as above, original documents placed in a predetermined location of the RADF 36 of the digital copy machine 30 are successively supplied, one sheet at a time, to the top of the original placement stand 35 of the scanner section 31, and original images successively read by means of the structure of the scanner unit 40 explained above are sent as 8-bit electronic data to the main image processing board 400.

The 8-bit electronic data sent to the main image processing board 400 undergoes predetermined processing in the multivalue image processing section 402 as 8-bit electronic image data.

This 8-bit electronic image data is then sent to the secondary image processing board 500 via the connector 405 on the main image processing board 400 side and the connector 505 on the secondary image processing board 500 side. In the multivalue/binary conversion section of the binary image processing section 501, the 8-bit electronic image data undergoes processing such as error diffusion, and is converted into 1-bit electronic image data. Processing such as error diffusion is carried out when converting the 8-bit electronic image data to 1-bit electronic image data in order to prevent impairment of image quality, since multivalue/binary conversion alone has problems with regard to image quality.

Again, the 8-bit electronic image data is converted to 1-bit electronic image data in consideration of memory capacity, etc.

Image data for each page of the original document, converted to 1-bit electronic image data in this way, is sent to a disk memory such as the hard disk (HD), where it is temporarily stored.

After all of the original documents placed in the RADF 36 of the digital copy machine 30 have been scanned, the 1-bit electronic image data temporarily stored in the hard disk is, by means of the control of the hard disk gate array 503, read out a plurality of times equal to an indicated number of copies. The 1-bit electronic image data read out is sent back through the connectors 505 and 405 to the main image processing board 400, where it undergoes processing such as gamma correction, and is then sent to the LSU 46 via the laser controller 404.

The present embodiment explains a case in which the stored image data is read out a plurality of times equal to a desired number of copies after completion of scanning of the images of all of the original documents. However, there is no limitation to this; another structure which may be used is one in which image output of the first multi-page copy is begun when a predetermined proportion of the images has been prepared (stored).

In this way, the original images read by the scanner section 31 of the digital copy machine 30 are outputted from the laser printer section 32 as copy images having gray-scale shading.

PRINTER MODE

Images sent from an external device such as a personal computer in network connection with the digital copy machine 30, after being developed as images in pages in the printer board 601, are sent via the interface gate array 504 to the secondary image processing board 500, and are temporarily stored in a memory such as the hard disk.

Here, although the images developed as page images by the printer board 601 are sent to the secondary image processing board 500, the page images do not undergo binary image processing, but are merely stored in the hard disk temporarily. Further, when the stored page images are read out from the hard disk, binary image processing is not performed thereon.

Then, the image data temporarily stored in the hard disk is read out from the hard disk so as to have a predetermined page order, and is sent to the main image processing board 400, where it undergoes gamma correction. Then the laser controller 404 controls image writing such that the LSU 46 recreates the images.

FACSIMILE MODE

Facsimile mode includes transmission of images to and receiving of images from another party.

First, processing for transmitting images to another party will be explained.

When transmitting images to another party, original documents to be transmitted, placed at a predetermined position in the RADF 36 of the digital copy machine 30, are successively supplied, one sheet at a time, to the top of the original placement stand 35 of the scanner section 31. Images of the original documents to be transmitted are successively read by means of the structure of the scanner unit 40 explained above, and are sent as 8-bit electronic data to the main image processing board 400.

Next, the 8-bit electronic data sent to the main image processing board 400 undergoes predetermined processing in the multivalue image processing section 402 as 8-bit electronic image data.

This 8-bit electronic image data is then sent to the secondary image processing board 500 via the connector 405 on the main image processing board 400 side and the connector 505 on the secondary image processing board 500 side. In the multivalue/binary conversion section of the binary image processing section 501, the 8-bit electronic image data undergoes processing such as error diffusion, and is converted into 1-bit electronic image data.

Processing such as error diffusion is carried out when converting the 8-bit electronic image data to 1-bit electronic image data in order to prevent impairment of image quality, since multivalue/binary conversion alone has problems with regard to image quality.

The original images to be transmitted, converted into binary images in this way, are compressed in a predetermined form and stored in the memory via the memory gate array 502. Then, transmission procedures are performed with the other party, and upon securing a state in which transmission is possible, the original images to be transmitted, compressed in a predetermined form and read out from the memory, are sent to the facsimile board 603. In the facsimile board 603, the original images to be transmitted undergo necessary processing, such as change of the form of compression, and are then successively transmitted to the other party through transmission lines.

Next, processing for receiving images from another party will be explained.

When original images are transmitted from another party through transmission lines, the facsimile board 603 performs transmission procedures and receives the original images transmitted by the other party. The received original images, compressed in a predetermined form, are sent through the facsimile interface to the binary image processing section 501 of the secondary image processing board 500, and are then reconstituted as page images by the compression/expansion section, etc. The received original images, reconstituted as images in pages, are then sent to the main image processing board 400, where they undergo gamma correction. Then the laser controller 404 controls image writing such that the LSU 46 recreates the images.

As can be seen from the foregoing structure, the image processing section for performing predetermined processing of image data is provided in a divided structure: the main image processing board 400 and the secondary image processing board 500. Here, the main image processing board 400 processes, as multivalue image data, original images read and inputted chiefly by the scanner section 31. The secondary image processing board 500 performs predetermined processing, such as binarization, of original image data after processing as multivalue image data by the main image processing section 400, or performs predetermined processing of image data sent from an external device through an external interface before sending this image data to the multivalue image processing section 402 of the main image processing board 400.

Further, the main image processing board 400 includes the laser controller 404, which controls writing of image data by the LSU 46 in order to recreate an image on the photoreceptor drum 48 (which uses the electrophotographic process).

With this structure, an original image read and inputted by the scanner section 31 can be recreated as a copy image by the laser printer section 32 without losing the image features the original possesses as a multivalue image. In addition, when outputting a large quantity of original images at high speed by means of the electronic RDH function, etc., the original images can be recreated as copy images by using the secondary image processing board 500, the hard disk, etc.

Further, the present structure is capable of performing suitable image data processing which is in keeping with the characteristic digital functions of the digital copy machine 30, such as processing and output of image data from external devices such as facsimile and printer, and, with regard to facsimile, binarizing of an image to be transmitted which has been multivalue image-processed (which preserves the features of the original image).

Further, separating the image processing section into two parts makes it possible to create a lineup of different variations of the digital copy machine 30, and thus to provide digital copy machines which meet the needs of different users. In addition, separating the image processing section into two parts makes it easy to use system development to tailor a digital copy machine to the needs of a particular user after purchase.

Further, the CPU 401 provided on the main image processing board 400 also manages and controls the secondary image processing board 500. In this way, the entire flow of image data, successively processed in the various processing sections, can be managed, and the flow of data and of processing goes smoothly. Accordingly, there is no loss of image data.

Figure 4:
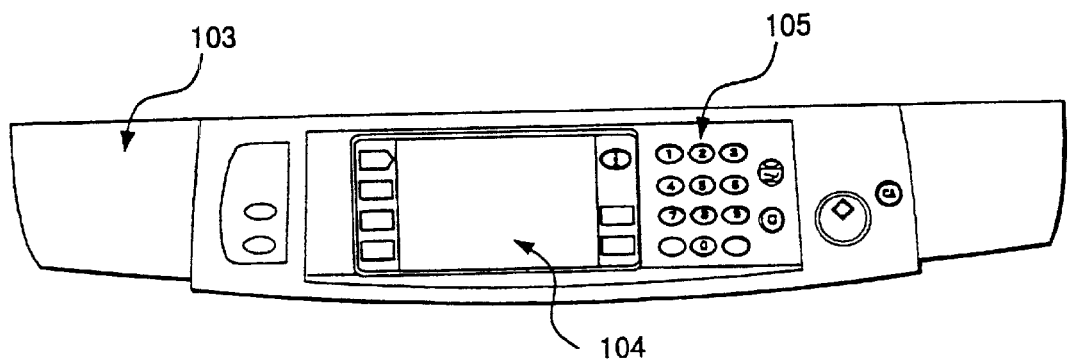
FIG. 4 is a plan view showing an operating panel of the foregoing digital copy machine.

Incidentally, the operating panel 103 controlled and managed by the operating panel board 100 shown in FIG. 3 includes, as shown in FIG. 4, an LCD display panel 104 provided substantially in the center of the operating panel 103, for display of various information, and a group of operating keys 105 provided around or to the left and right of the LCD display panel 104, for inputting and indicating various operating conditions of the digital copy machine 30.

In a structure as outlined above, the following will explain the distinctive features of the present invention.

Figure 5:
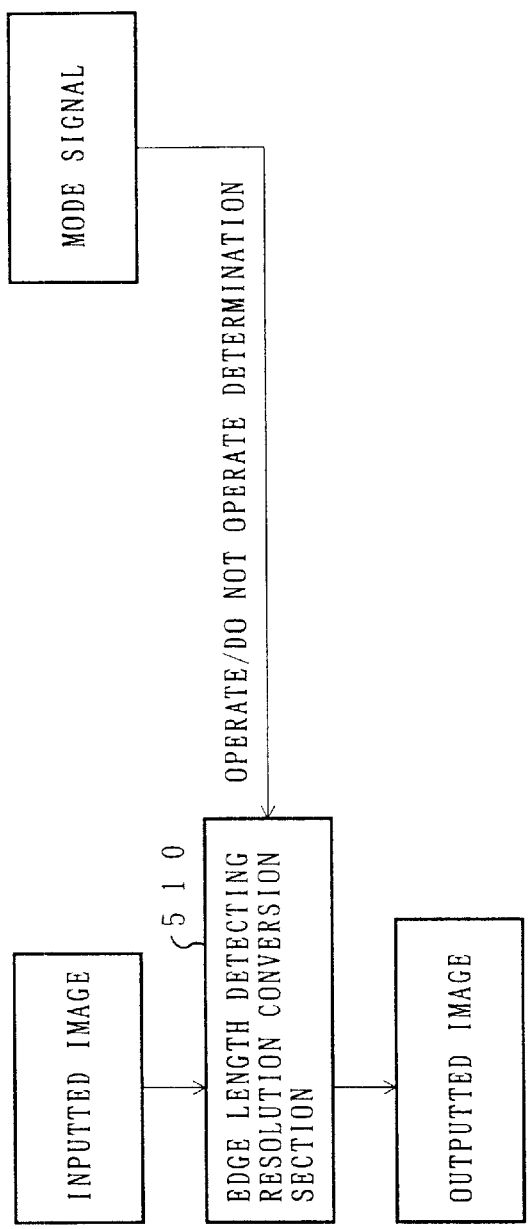
FIG. 5 is a block diagram showing an edge length detecting resolution conversion section of the foregoing digital copy machine.

First, the digital copy machine 30 according to the present embodiment is provided with an edge length detecting resolution conversion section 510, shown in FIG. 5, which performs resolution conversion or scaling of a binary image. The edge length detecting resolution conversion section 510 is provided in the secondary image processing board 500, and is directed to operate or not to operate based on a mode signal from the main CPU 401. Incidentally, the foregoing binary image may be, for example, an image received by means of the facsimile function.

Figure 6:
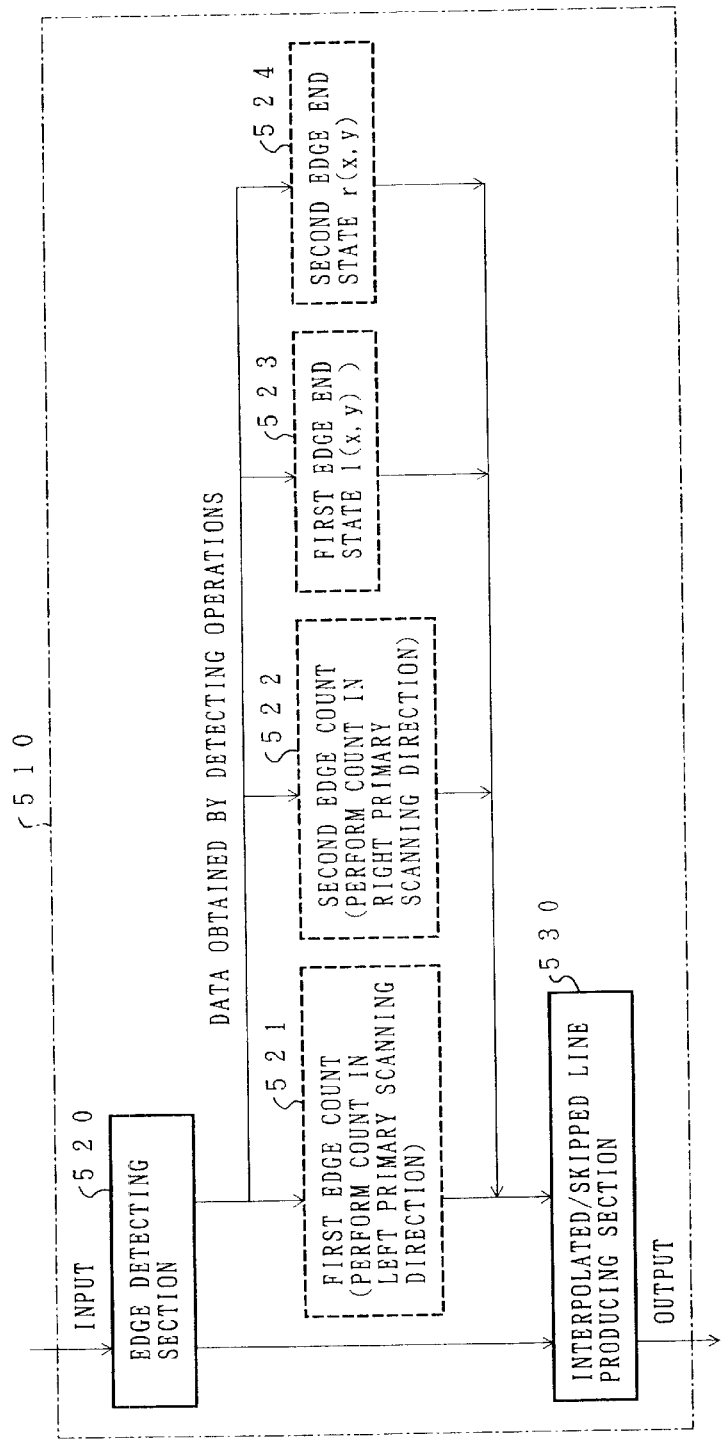
FIG. 6 is a block diagram showing an edge detecting section and an interpolated/skipped line producing section of the foregoing edge length detecting resolution conversion section.

As shown in FIG. 6, the edge length detecting resolution conversion section 510 includes an edge detecting section 520 (edge detecting means) and an interpolated/skipped line producing section 530 (interpolating means).

The edge detecting section 520, during resolution conversion or scaling of a binary image, detects edges of the image, and detects the lengths and shapes of those edges. The edge detecting section 520 outputs the following data: a first edge count 521, a second edge count 522, a first edge end state 523, and a second edge end state 524.

The first edge count 521 is count data in the left primary scanning direction, and the second edge count 522 is count data in the right primary scanning direction.

Further, the first edge end state 523 is data l(x,y) of four pixels adjacent to the left end of an edge (to be discussed below), and the second edge end state 524 is data r(x,y) of four pixels adjacent to the right end of an edge (to be discussed below).

The interpolated/skipped line producing section 530 performs resolution conversion or scaling processing based on the lengths and shapes of edges detected by the edge detecting section 520.

The following will explain an interpolating method in which an inputted image is interpolated by two times in the secondary scanning direction (thus increasing resolution by two times in the secondary scanning direction or enlarging the inputted image by 200% in the secondary scanning direction) using the resolution conversion/scaling method in the edge detecting section 520 and the interpolated/skipped line producing section 530 with the respective foregoing structures.

The foregoing operations will be explained in accordance with the following definitions.

First, in an inputted image, the upper left corner of the image will be the originating point. The direction of a line from the upper left corner to the upper right corner will be the primary scanning direction, and the direction of a line perpendicular to the primary scanning direction, i.e., of a line from the upper left corner to the lower left corner, will be the secondary scanning direction.

Further, a group of pixels aligned, in the primary scanning direction, with a given secondary scanning direction position will be a line, and the pixel in a given primary scanning direction position of a given line will be referred to as the "pixel in question."

1. DETECTING AN EDGE

Figure 7:
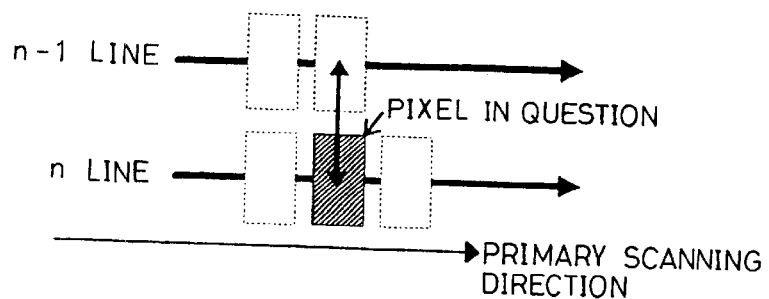
FIG. 7 is an explanatory drawing showing operations for detecting an edge in the resolution conversion or scaling method of the foregoing digital copy machine.

First, as shown in FIG. 7, an edge in the secondary scanning direction is detected by a density relationship between the pixel in question and a pixel in the same primary scanning direction position but in the previous line. Places where pixel density changes from white to black or from black to white are judged to be edges, and are detected as such.

Here, the coordinates of a pixel in question will be (x,y), and the density of the pixel in question will be f(x,y). Here, x is a variable expressing the primary scanning direction, and y is a variable expressing the secondary scanning direction.

The density value of the pixel in question will be 1 when the pixel is black, and 0 when the pixel is white. Further, the density relationship between the pixel in question and the pixel in the same primary scanning direction position but in the previous line will be calculated by the following operation:

$$g(x,y):f(x,y)-f(x,y-1)$$

Here, g(x,y) can be −1, 0, or 1, and in the case of −1 or 1, the pixel in question (x,y) is judged to be an edge.

2. DETECTING EDGE ENDS AND EDGE LENGTH

When, by means of the method in 1 above, the pixel in question is determined to be an edge in the secondary scanning direction, it is next determined how far that edge extends in the primary scanning direction, i.e., the ends of the edge are detected.

(1) First, g(x+1,y)−g(x,y) is calculated, yielding a result h(x,y).

An end of the edge is searched for using this value. In other words, h(x,y) can be a value from −2 through 2, and in the case of zero, i.e., when there is no change in the state of the edge in the adjacent pixel in the primary scanning direction, the pixel in question (x,y) is judged not to be an edge end. In the case of any other value (−2, −1, 1, or 2), i.e., when there is a change in the state of the edge in the adjacent pixel in the primary scanning direction, the pixel in question (x,y) is judged to be an edge end.

(2) Next, the distance from the pixel in question (x,y) to the left end of the edge is found. The distance from the pixel in question to the left end of the edge will be expressed as i(x,y).

In order to find the distance from the pixel in question to the left end of the edge, first the state of the edge g(x,y) at the pixel in question is compared with that at the immediately preceding pixel g(x−1,y). If the state of the edge g at the pixel in question (x,y) is the same as the state of the edge g at the immediately preceding pixel (x−1,y), 1 is added to the value of the distance i(x,y) from the pixel in question to the left end of the edge. For example, in FIG. 8, since the state of the edge g is the same for the row of the pixel in question (x,y) and the row of the immediately preceding pixel (x−1,y), the distance from the pixel in question to the left end of the edge is increased by 1.

Figure 8:
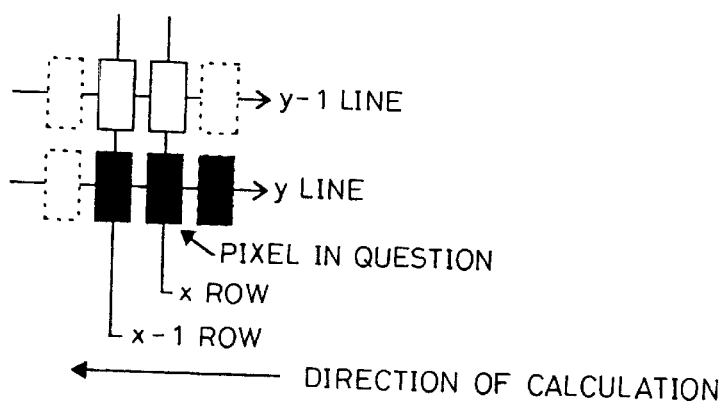
FIG. 8 is an explanatory drawing showing, in the foregoing resolution conversion or scaling, operations for detecting an edge length by calculating the distance from the left end of the edge to a pixel in question by calculating in a direction opposite the primary scanning direction.

The foregoing comparison with the state of the edge g at the pixel in question (x,y) is repeated for preceding pixels, moving from right to left: (x−1,y), x−2,y), (x−3,y), ... When the state of the edge g at the compared pixel is the same as that at the pixel in question (x,y), the distance i(x,y) from the pixel in question to the left end of the edge is increased by 1. When the state of the edge g at the compared pixel differs from that at the pixel in question (x,y), the compared pixel is judged to be the left end of the edge, and the value of i(x,y) at that time is the distance from the pixel in question (x,y) to the left end of the edge. In FIG. 8, since the pixel (x−1,y) is the left end of the edge, i(x,y)=1.

In FIG. 8, if, for example, the pixel in question were in the x+1row, then the distance from the pixel in question (x+1,y) to the left end of the edge would be i(x+1,y)=2.

(3) The distance from the pixel in question to the right end of the edge is also found, i.e., a change in the state of the edge g is searched for moving from the pixel in question (x,y) to the right. The distance from the pixel in question to the right end of the edge will be expressed as j (x,y).

In the same way as above, the state of the edge g at the pixel in question (x,y) is successively compared with that at following pixels (x+1,y), (x+2,y), ... , (x+3,y), ... , and when the state of the edge g at the compared pixel is the same as that at the pixel in question (x,y), the distance j (x,y) from the pixel in question to the right end of the edge is increased by 1.

Figure 9:
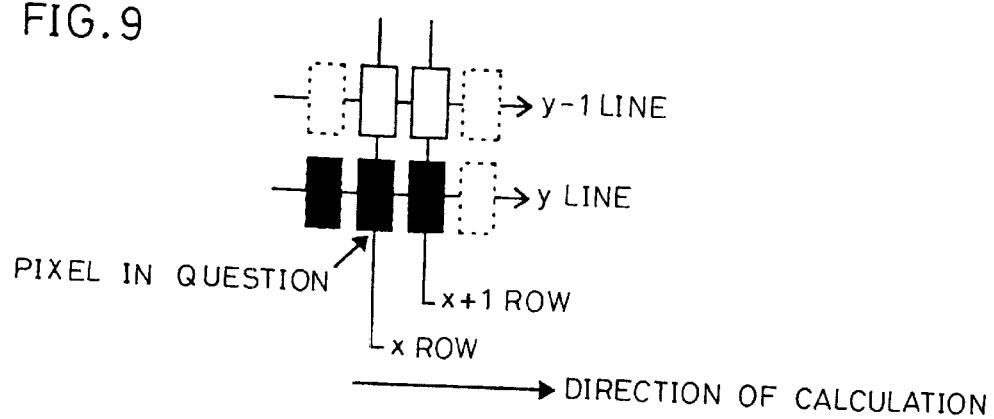
FIG. 9 is an explanatory drawing showing, in the foregoing resolution conversion or scaling, operations for detecting an edge length by calculating the distance from the right end of the edge to a pixel in question by calculating in the same direction as the primary scanning direction.

For example, in FIG. 9, since the state of the edge g is the same for the row of the pixel in question (x,y) and the row of the immediately following pixel (x+1,y), the distance from the pixel in question to the right end of the edge is increased by 1. In FIG. 9, since the pixel (x+1,y) is the right end of the edge, i(x,y)=1.

Figure 10:
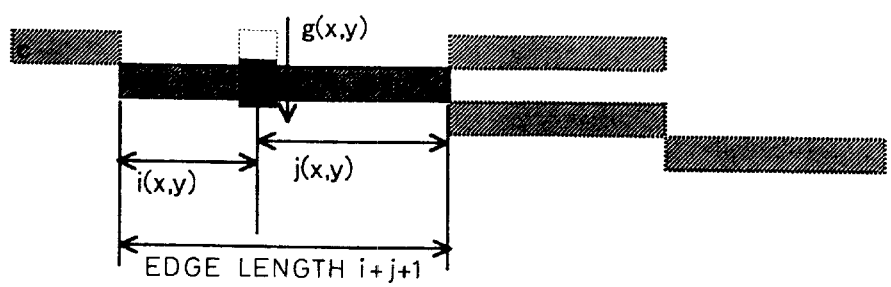
FIG. 10 is an explanatory drawing showing, in the foregoing resolution conversion or scaling, operations for calculating edge length from the results of the operations shown in FIGS. 8 and 9.

(4) Next, the length of the edge is calculated from the distance i(x,y) of the pixel in question (x,y) from the left end of the edge, calculated in (2) above, and the distance j(x,y) of the pixel in question (x,y) from the right end of the edge, calculated in (3) above. In other words, as shown in FIG. 10, the length of the edge is calculated as follows:

$$i(x,y)+j(x,y)+1$$

3. OBTAINING DATA REGARDING THE STATE OF PIXELS AROUND EDGE ENDS

Data regarding the length of an edge which includes a pixel in question (x,y), and the positions of the ends of the edge, were obtained by means of the foregoing operations.

Figure 11:
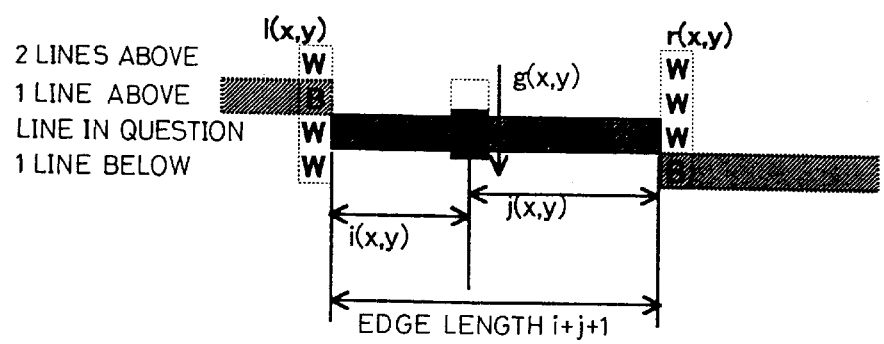
FIG. 11 is an explanatory drawing showing, in the foregoing resolution conversion or scaling, operations for obtaining data regarding the state of pixels adjacent to the ends of an edge.

Next, data is obtained regarding the state of pixels around the ends of the edge, i.e., the state of pixels adjacent to the right and left ends of the edge. Specifically, data regarding whether there is. another edge near either end of the edge in question, and, when there is another edge near either end of the edge in question, data regarding the positional relationship of that edge to the edge in question, is obtained from the state of pixels of four lines in primary scanning direction positions adjacent to each end of the edge in question (not including the edge in question). As shown in FIG. 11, these four lines are the line in question, two preceding lines, and one following line. For each end of the edge in question, one pixel from each line is used, i.e., a total of four pixels are used at each end of the edge in question.

With a pixel in question of position (x,y), when the data regarding the four pixels adjacent to the left end of the edge is l(x,y), and the data regarding the four pixels adjacent to the right end of the edge is r(x,y), l(x,y) and r(x,y) are shown by the density values of the respective four pixels:

$$l(x,y)=\{f(x-i-1, y-2), \ldots , f(x-i-1, y+1)\}$$

$$r(x,y)=\{f(x+j+1, y-2), \ldots , f(x+j+1, y+1)\}$$

Since, as discussed above, the density value f is either 0 or 1, a four-bit value is assigned to each of l(x,y) and r(x,y) by lining up the 0/1 data for the respective pixels of two lines above (highest), one line above, the line in question, and one line below (lowest), in that order.

As a result, l(x,y) and r(x,y) have the same values for each pixel in an edge, because l(x,y) and r(x,y) are calculated from the four pixels adjacent to the left and right ends of the edge.

4. DETECTING EDGE SHAPE

Next, the state and position of the edge, and the state of the pixels adjacent to the left and right ends of the edge, found by means of the foregoing operations for a pixel in question, will be used to determine the shape of the edge which includes the pixel in question.

FIGS. 12(*a*) through 12(*f*) show pixels necessary to determine the shape of an edge. Data regarding whether an edge in question including the pixel in question is a black edge or a white edge, and data regarding the state of pixels adjacent to the left and right ends of the edge, were obtained by means of the foregoing operations.

Here, the edges shown in FIGS. 12(*a*) through 12(*c*) are made up of white pixels (shown by hatching in the Figures), and the line preceding the line of the edge in question is made up of black pixels. When the states of the pixels adjacent to the ends of the edge are as shown in FIG. 12(*a*), the edge will be referred to as an edge which descends to the right; when as shown in FIG. 12(*b*), the edge will be referred to as an edge which descends to the left; and when as shown in FIG. 12(*c*), the edge will be referred to as an indented edge. Further, when the edge falls under none of these, it will be referred to as a flat edge.

Again, the edges shown in FIGS. 12(*d*) through 12(*f*) are made up of black pixels, and the line preceding the line of the edge in question is made up of white pixels. When the states of the pixels adjacent to the ends of the edge are as shown in FIG. 12(*d*), the edge will be referred to as an edge which descends to the right; when as shown in FIG. 12(*e*), the edge will be referred to as an edge which descends to the left; and when as shown in FIG. 12(*f*), the edge will be referred to as an indented edge. Further, when the edge falls under none of these, it will be referred to as a flat edge.

5. INTERPOLATING OR SKIPPING LINES OF AN IMAGE

Here, an original image will be interpolated by two times in the secondary scanning direction. In this case, the number of lines, i.e. the number of pixels, in the secondary scanning direction is doubled. First, the arrangement of pixels in each line of the original image is saved. Then, for each original line, an additional line is formed and inserted before the corresponding original line. Thus the original image is interpolated by two times in the secondary scanning direction.

Figure 13:
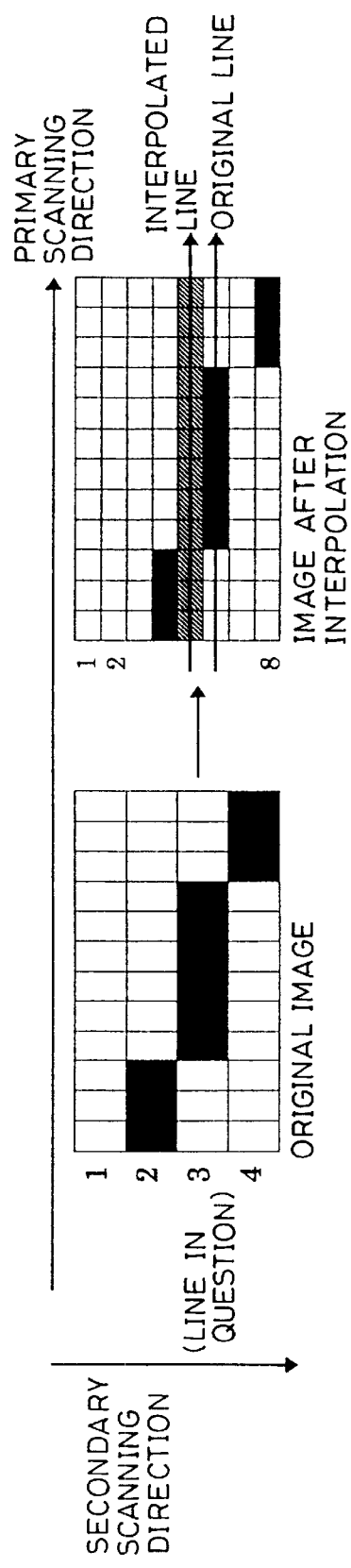
FIG. 13 is an explanatory drawing showing, in the foregoing resolution conversion or scaling, operations for magnifying by two times by interpolating lines in the secondary scanning direction.

Specifically, as shown in FIG. 13, while retaining the original image, new lines are produced with reference to the original lines and inserted therebetween.

6. INTERPOLATING/SKIPPING IN ACCORDANCE WITH EDGE STATE AND SHAPE AND STATE OF ADJACENT PIXELS

By means of the foregoing method, the shapes of edges were determined. Next, for edges which descend to the right or descend to the left, it is determined whether an end of the edge in question is in the midst of an incline, or is the end of the incline.

Figure 1:
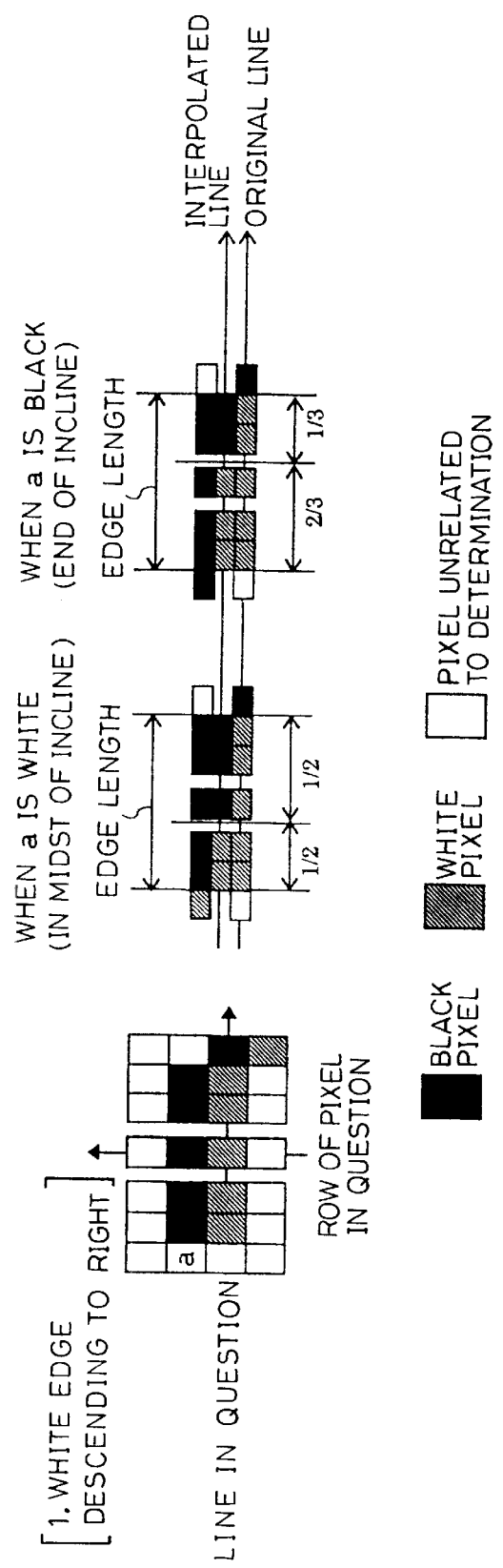
FIG. 1 is an explanatory drawing showing, in a resolution conversion or scaling method of a digital copy machine according to one embodiment of the present invention, a method of interpolating with a white edge which descends to the right.

When, as shown in FIG. 1, an edge in question is determined to be a white edge which descends to the right, it is determined whether the left end of the edge in question is in the midst of an incline, or whether it is the end of the incline. This determination is made based on, in addition to the state of the pixels necessary to determine the incline, the state of a pixel a (shown in FIG. 1) adjacent to the left end of the edge. The adjacent pixel a is a black or white pixel not part of the edge.

When the adjacent pixel a is white, the left end of the edge in question is determined to be in the midst of an incline, and when the adjacent pixel a is black, the left end of the edge in question is determined to be the end of the incline. Then, when the left end of the edge in question is in the midst of the incline, in the interpolated line, from the left end of the edge to ½ of the length thereof, white pixels are interpolated by retaining the pixels, i.e. the white pixels of the original line, and from ½ of the length of the edge to the right end thereof, black pixels are interpolated by inverting the pixels, i.e. the white pixels of the original line.

When, on the other hand, the left end of the edge in question is the end of the incline, in the interpolated line, from the left end of the edge to ⅔ of the length thereof, white pixels are interpolated by retaining the white pixels of the original line, and from ⅔ of the length of the edge to the right end thereof, black pixels are interpolated by inverting the white pixels of the original line.

Figure 14:
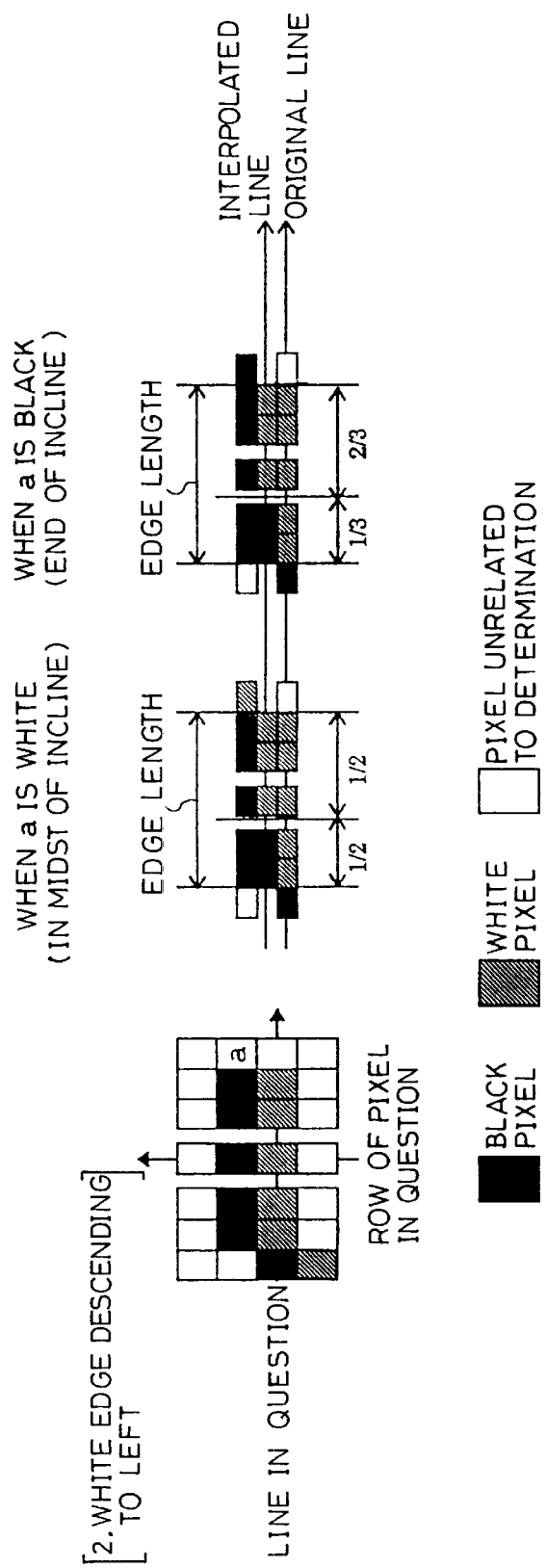
FIG. 14 is an explanatory drawing showing, in the foregoing resolution conversion or scaling, a method of interpolating based on the length and shape of an edge, in the case of a white edge which descends to the left.

Next, FIG. 14 shows the state of the pixels when an edge in question is determined to be a white edge which descends to the left. Here again, it is determined whether the right end of the edge in question is in the midst of an incline, or whether it is the end of the incline. This determination is made based on, in addition to the state of the pixels necessary to determine the incline, the state of a pixel a (shown in the Figure) adjacent to the right end of the edge. When the adjacent pixel a is white, the right end of the edge in question is determined to be in the midst of an incline, and when the adjacent pixel a is black, the right end of the edge in question is determined to be the end of the incline.

Then, when the right end of the edge in question is in the midst of an incline, in the interpolated line, from the left end of the edge to ½ of the length thereof, black pixels are interpolated by inverting the white pixels of the original line, and from ½ of the length of the edge to the right end thereof, white pixels are interpolated by retaining the white pixels of the original line.

When, on the other hand, the right end of the edge in question is the end of the incline, in the interpolated line, from the left end of the edge to ⅓ of the length thereof, black pixels are interpolated by inverting the white pixels of the original line, and from ⅓ of the length of the edge to the right end thereof, white pixels are interpolated by retaining the white pixels of the original line.

Figure 15:
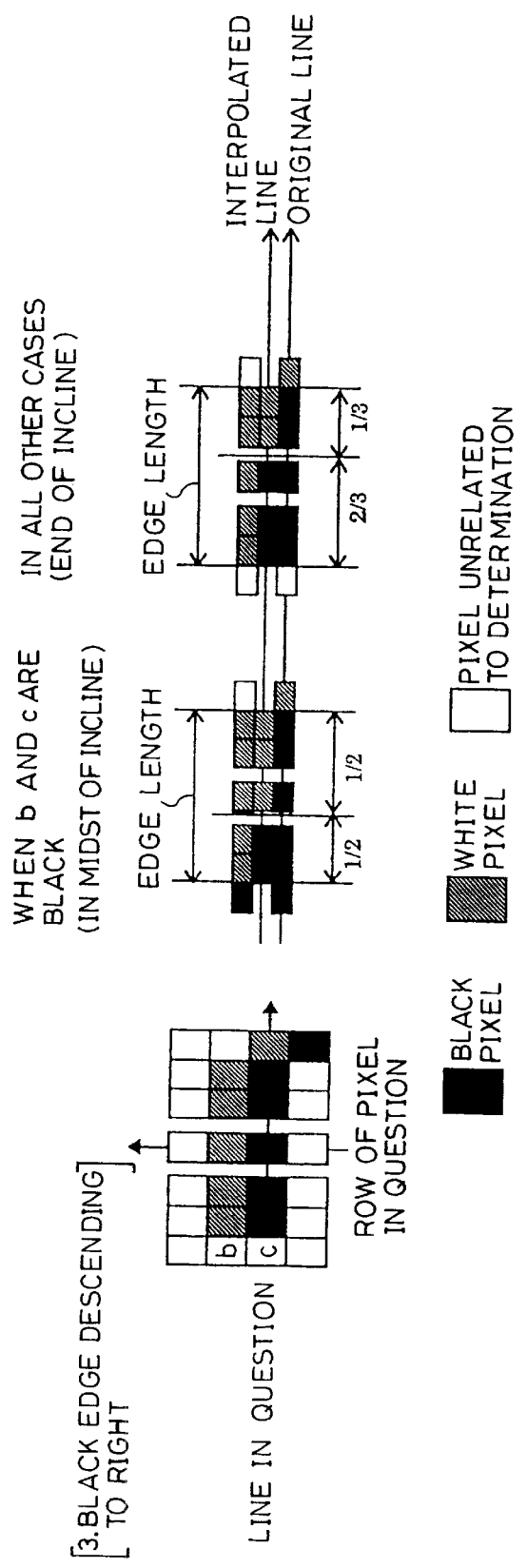
FIG. 15 is an explanatory drawing showing, in the foregoing resolution conversion or scaling, a method of interpolating based on the length and shape of an edge, in the case of a black edge which descends to the right.

Next, FIG. 15 shows the state of the pixels when an edge in question is determined to be a black edge which descends to the right. Here again, it is determined whether the left end of the edge in question is in the midst of an incline, or whether the left end of the edge is the end of the incline. This determination is made based on, in addition to the state of the pixels necessary to determine the incline, the state of pixels b and c (shown in the Figure) adjacent to the left end of the edge. When both of the adjacent pixels b and c are black, the left end of the edge in question is determined to be in the midst of an incline, and in any other case, the left end of the edge in question is determined to be the end of the incline.

Then, when the left end of the edge in question is in the midst of an incline, in the interpolated line, from the left end of the edge to ½ of the. length thereof, black pixels are interpolated by retaining the black pixels of the original line, and from ½ of the length of the edge to the right end thereof, white pixels are interpolated by inverting the black pixels of the original line.

When, on the other hand, the left end of the edge in question is the end of the incline, in the interpolated line, from the left end of the edge to ⅔ of the length thereof, black pixels are interpolated by retaining the black pixels of the original line, and from ⅔ of the length of the edge to the right end thereof, white pixels are interpolated by inverting the black pixels of the original line.

Figure 16:
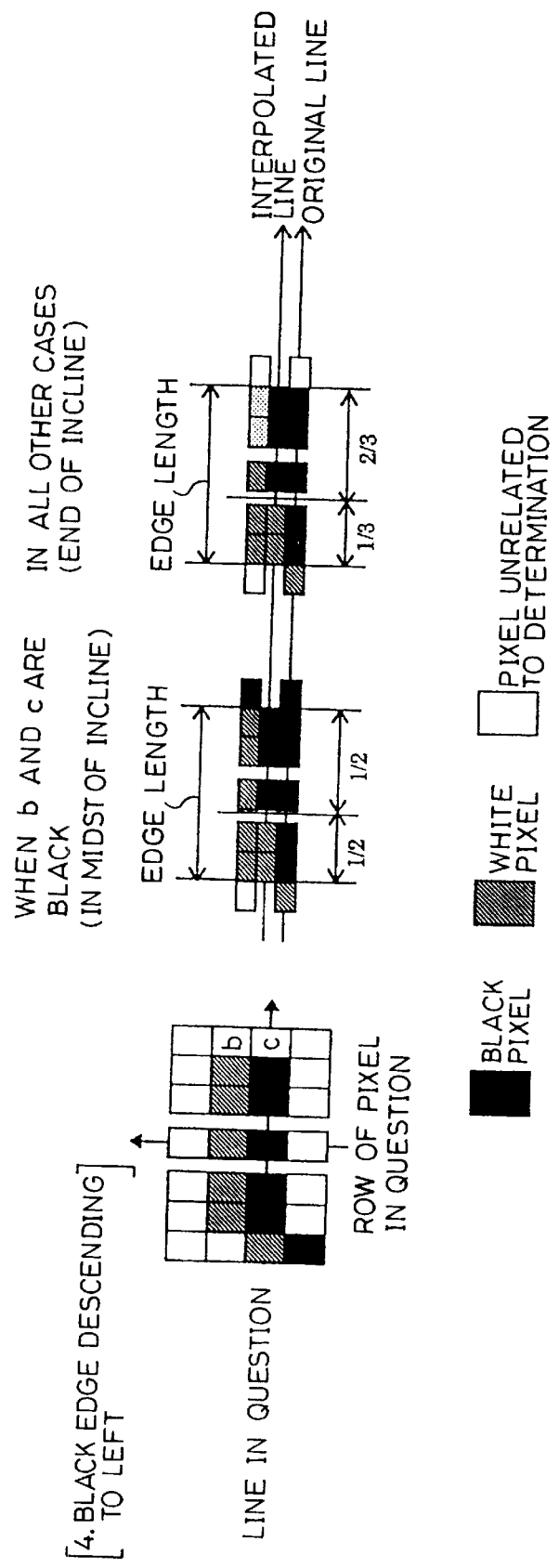
FIG. 16 is an explanatory drawing showing, in the foregoing resolution conversion or scaling, a method of interpolating based on the length and shape of an edge, in the case of a black edge which descends to the left.

Next, FIG. 16 shows the state of the pixels when an edge in question is determined to be a black edge which descends to the left. Here again, it is determined whether the right end of the edge in question is in the midst of an incline, or whether the right end of the edge is the end of the incline. This determination is made based on, in addition to the state of the pixels necessary to determine the incline, the state of pixels b and c (shown in the Figure) adjacent to the right end of the edge. When both of the adjacent pixels b and c are black, the right end of the edge in question is determined to be in the midst of an incline, and in all other cases, the right end of the edge in question is determined to be the end of the incline.

Then, when the right end of the edge in question is in the midst of an incline, in the interpolated line, from the left end of the edge to ½ of the length thereof, white pixels are interpolated by inverting the black pixels of the original line, and from ½ of the length of the edge to the right end thereof, black pixels are interpolated by retaining the black pixels of the original line.

When, on the other hand, the right end of the edge in question is the end of the incline, in the interpolated line, from the left end of the edge to ⅔ of the length thereof, white pixels are interpolated by inverting the black pixels of the original line, and from ⅔ of the length of the edge to the right end thereof, black pixels are interpolated by retaining the black pixels of the original line.

Figure 17:
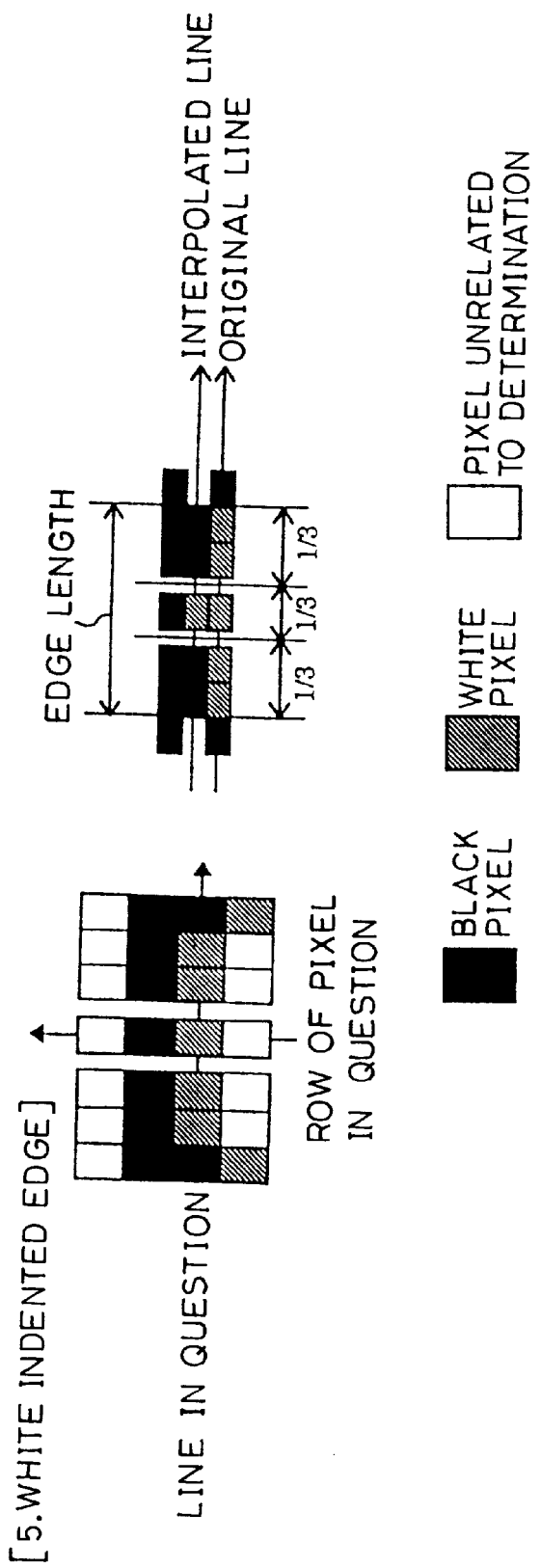
FIG. 17 is an explanatory drawing showing, in the foregoing resolution conversion or scaling, a method of interpolating based on the length and shape of an edge, in the case of an indented white edge.

Next, FIG. 17 shows the state of the pixels when an edge in question is determined to be an indented white edge.

In the interpolated line this case, in order to maintain the indentation, from the left end of the edge to ⅓ of the length thereof, black pixels are interpolated by inverting the white pixels of the original line, from ⅓ of the length of the edge to ⅔ of the length thereof, white pixels are interpolated by retaining the white pixels of the original line, and from ⅔ of the length of the edge to the right end thereof, black pixels are interpolated by inverting the white pixels of the original line.

Figure 18:
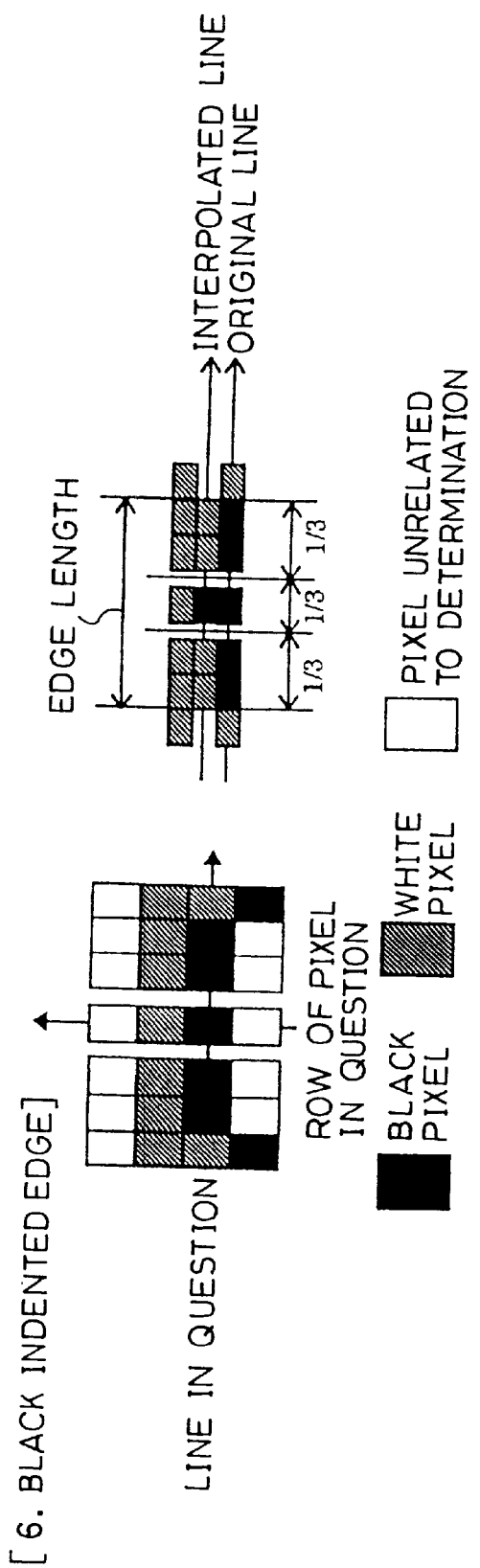
FIG. 18 is an explanatory drawing showing, in the foregoing resolution conversion or scaling, a method of interpolating based on the length and shape of an edge, in the case of an indented black edge.

Next, FIG. 18 shows the state of the pixels when an edge in question is determined to be an indented black edge.

In the interpolated line this case, in order to maintain the indentation, from the left end of the edge to ⅓ of the length thereof, white pixels are interpolated by inverting the black pixels of the original line, from ⅓ of the length of the edge to ⅔ of the length thereof, black pixels are interpolated by retaining the black pixels of the original line, and from ⅔ of the length of the edge to the right end thereof, white pixels are interpolated by inverting the black pixels of the original line.

In cases which do not fall under any of the foregoing, a line having the same arrangement of pixels as the saved original line is retained as is as the interpolated line.

By means of the foregoing method, an image can be obtained in which the original image is interpolated by two times in the secondary scanning direction.

The following will concisely summarize the foregoing explanation in an easily understandable form.

In conventional digital scaling, i.e., enlargement, straight-line inclined edges were made uneven, i.e., jagged, yielding an unattractive image.

For example, assume that the following image is to be enlarged by two times vertically.

←This line to be enlarged
 2×vertically.

Simple interpolation by means of the conventional art yields the following.

←Enlargement increases unevenness
←of incline.

With the method of the present embodiment, however, as explained in 6 above, the state of a pixel a adjacent to the left end of the edge is checked.

a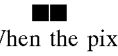

When the pixel a is a black pixel, in the interpolated line, white pixels are interpolated for ½ of the length of the edge, and black pixels are interpolated for the other ½ of the length of the edge.

←

When the pixel a is a white pixel, in the interpolated line, white pixels are interpolated for ⅔ of the length of the edge, and black pixels are interpolated for the other ⅓ of the length of the edge.

←

By means of this interpolation processing, jaggedness in straight-line inclined edges can be prevented, and smoothing processing can be performed.

As discussed above, in the digital copy machine 30 according to the present embodiment, when forming an image by performing resolution conversion or scaling of a binary image, the edge detecting section 520 detects the lengths and shapes of edges.

In other words, since an edge is a place of change from black pixels to white pixels or vice versa, the length and shape of an edge can be grasped on a pixel-by-pixel basis. For this reason, the edge detecting section 520 can detect the incline of a line of shallow angle. Further, since the interpolated/skipped line producing section 530 performs resolution conversion processing or scaling processing based on the lengths and shapes of edges detected by the edge detecting section 520, pixels can be interpolated at optimum positions. As a result, it is possible to perform smoothing correction of, in particular, inclined lines of shallow angle, such as gradually inclined images, and thus to provide a low-cost digital copy machine 30 capable of performing resolution conversion or scaling processing of high image quality.

Further, the only method of detecting edge length conventionally envisioned was by grasping the state of the entire image, but such a method requires a fairly large readable/writable memory, and, further, since algorithms for that purpose were too complex, this method was impossible to realize.

However, in the digital copy machine 30 according to the present embodiment, when detecting edges of the image, and lengths and shapes of the edges, the edge detecting section 520 compares pixels of an edge with those of an adjacent line parallel to the primary scanning direction, beginning with a pixel in question and moving in both directions, and thus the positions of the ends of the edge and the length of the edge can be found.

For this reason, the state of an edge, such as its length and shape, can be found in a line memory.

As a result, it is possible to achieve resolution conversion or scaling processing of high image quality with a structure of even lower cost.

Further, in the digital copy machine 30 according to the present embodiment, the edge detecting section 520 detects the shape of an edge as descending to the left, descending to the right, or indented, and, according to the detected shape, the interpolated/skipped line producing section 530 changes the method of interpolating or skipping at the time of resolution conversion or scaling processing.

For this reason, by detecting whether an edge descends to the left, descends to the right, or is indented, and performing interpolating or skipping which is optimum for the shape of the edge, it is possible to perform smoothing correction of, in particular, inclined lines of shallow angle, such as gradually inclined images.

Further, in the digital copy machine 30 according to the present embodiment, when an edge is determined to be an end of an incline or to be an indentation, the interpolated/skipped line producing section 530 changes its usual method of interpolating or skipping lines. For this reason, even more suitable interpolating or skipping of lines can be performed.

As a result, it is possible to perform smoothing correction of, in particular, inclined lines of shallow angle, such as gradually inclined images.

Further, in the digital copy machine 30 according to the present embodiment, when detecting the shape of an edge, the edge detecting section 520 refers to the state and length of the edge, and to the state of pixels adjacent to each end thereof.

For this reason, when detecting edge shape, by referring to data regarding the state and length of the edge and to the state of pixels adjacent to each end of the edge, an edge shape of greater precision can be detected. As a result, it is possible to recreate, in particular, inclined lines of shallow angle, such as gradually inclined images.

Further, in the digital copy machine 30 according to the present embodiment, the edge detecting section 530 detects the shape of an edge as one of three shapes: descending to the left, descending to the right, or indented.

For this reason, by detecting the shape of an edge as one of descending to the left, descending to the right, or indented, the results of shape detection can be classified, and simple algorithms can be realized.

As a result, it is possible to recreate, in particular, inclined lines of shallow angle, such as gradually inclined images, in a hardware structure of low cost.

In the image forming device according to the present invention, it is preferable if, as discussed above, the edge detecting means detect the length and shape of an edge by comparing a given pixel, belonging to a line parallel to a primary scanning direction, with pixels of an adjacent line parallel to the primary scanning direction, and detect the length of the detected edge and the positions of the ends thereof by comparing the given pixel with other pixels of the line parallel to the primary scanning direction to which the given pixel belongs, moving from the given pixel in both directions along the line.

In other words, the only method of detecting edge length conventionally envisioned was by grasping the state of the entire image, but such a method requires a fairly large readable/writable memory, and, further, since algorithms for that purpose were too complex, this method was impossible to realize.

However, in the foregoing invention, when detecting edges of the image, and lengths and shapes of the edges, the edge detecting means compare a pixel of an edge with those of a neighboring line parallel to the primary scanning direction, beginning with the pixel in question and moving in both directions, and thus the positions of the ends of the edge and the length of the edge can be found.

For this reason, hardware for detecting the state of an edge, such as its length and shape, can be structured as a line memory.

As a result, it is possible to achieve resolution conversion or scaling processing of high image quality with a structure of even lower cost.

Further, it is preferable if the edge detecting means detect the shape of an edge as descending to the left, descending to the right, or indented, and if, according to the detected shape, the interpolating means change the method of interpolating or skipping at the time of resolution conversion or scaling processing.

With this structure, the edge detecting means detect an edge as one of three shapes: descending to the left, descending to the right, or indented; and, according to the detected shape, the interpolating means change the method of interpolating or skipping at the time of resolution conversion or scaling processing.

For this reason, by detecting a shape of descending to the left, descending to the right, or indented, and performing interpolating or skipping which is optimum for the shape, it is possible to recreate, in particular, inclined lines of shallow angle, such as gradually inclined images.

Further, it is preferable, when an edge is determined to be an end of an incline or to be an indentation, if the interpolating means change the usual method of interpolating or skipping lines.

With this structure, when an edge is determined to be an end of an incline or an indentation, since the interpolating means change the usual method of interpolating or skipping lines, even more suitable interpolating or skipping of lines can be performed.

As a result, it is possible to recreate, in particular, inclined lines of shallow angle, such as gradually inclined images.

Second Embodiment

The following will explain another embodiment of the present invention with reference to FIGS. 19 through 28(*d*). For ease of explanation, members having the same functions as those shown in the drawings pertaining to the first embodiment above will be given the same reference symbols, and explanation thereof will be omitted here.

In the present embodiment, using as inputted image the image obtained in the first embodiment above by interpolating by two times in the secondary scanning direction, resolution conversion will be performed such that each pixel of the inputted image is expanded to 3×3 pixels.

Figure 19:
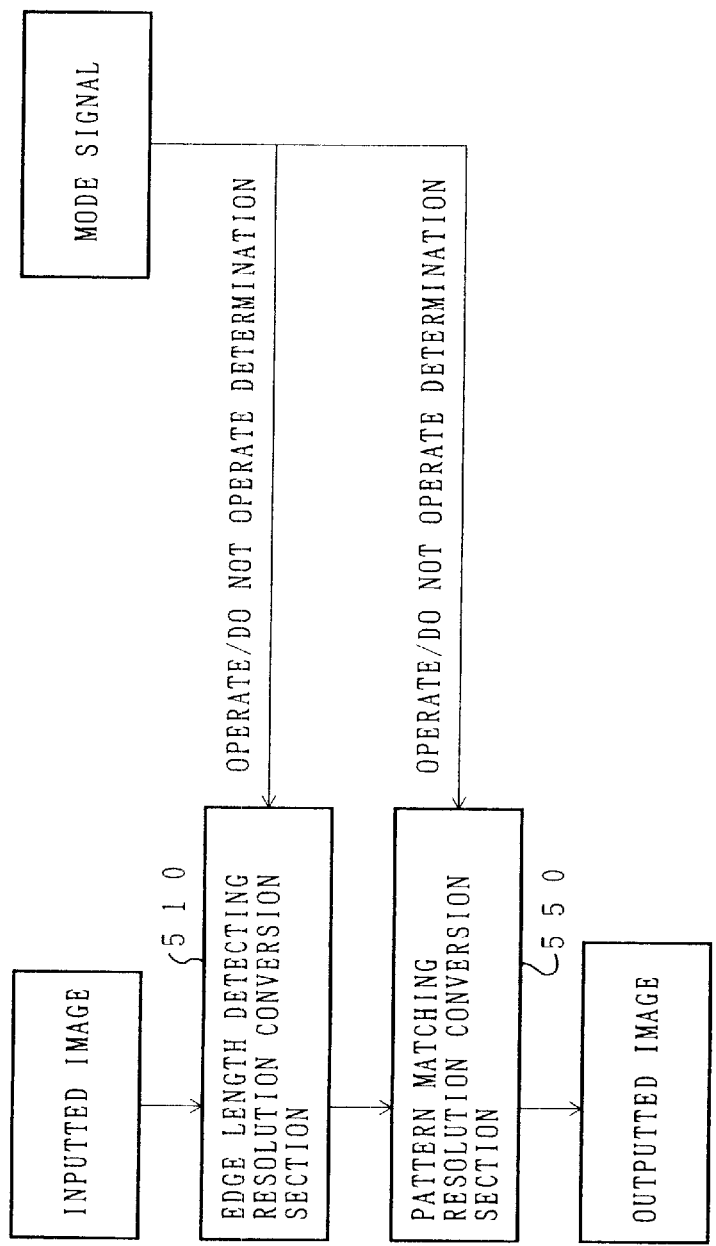
FIG. 19 is a block diagram showing an edge length detecting resolution conversion section and a pattern matching resolution conversion section of a digital copy machine according to another embodiment of the present invention.

First, as shown in FIG. 19, the digital copy machine 30 according to the present embodiment, in addition to the edge length detecting resolution conversion section 510, which performs resolution conversion or scaling of the inputted image previously image-processed into a binary image, is also provided with a pattern matching resolution conversion section 550 as combining means. The pattern matching resolution conversion section 550 is also provided in the secondary image processing board 500, and is directed to operate or not to operate based on a mode signal from the main CPU 401.

Figure 20:
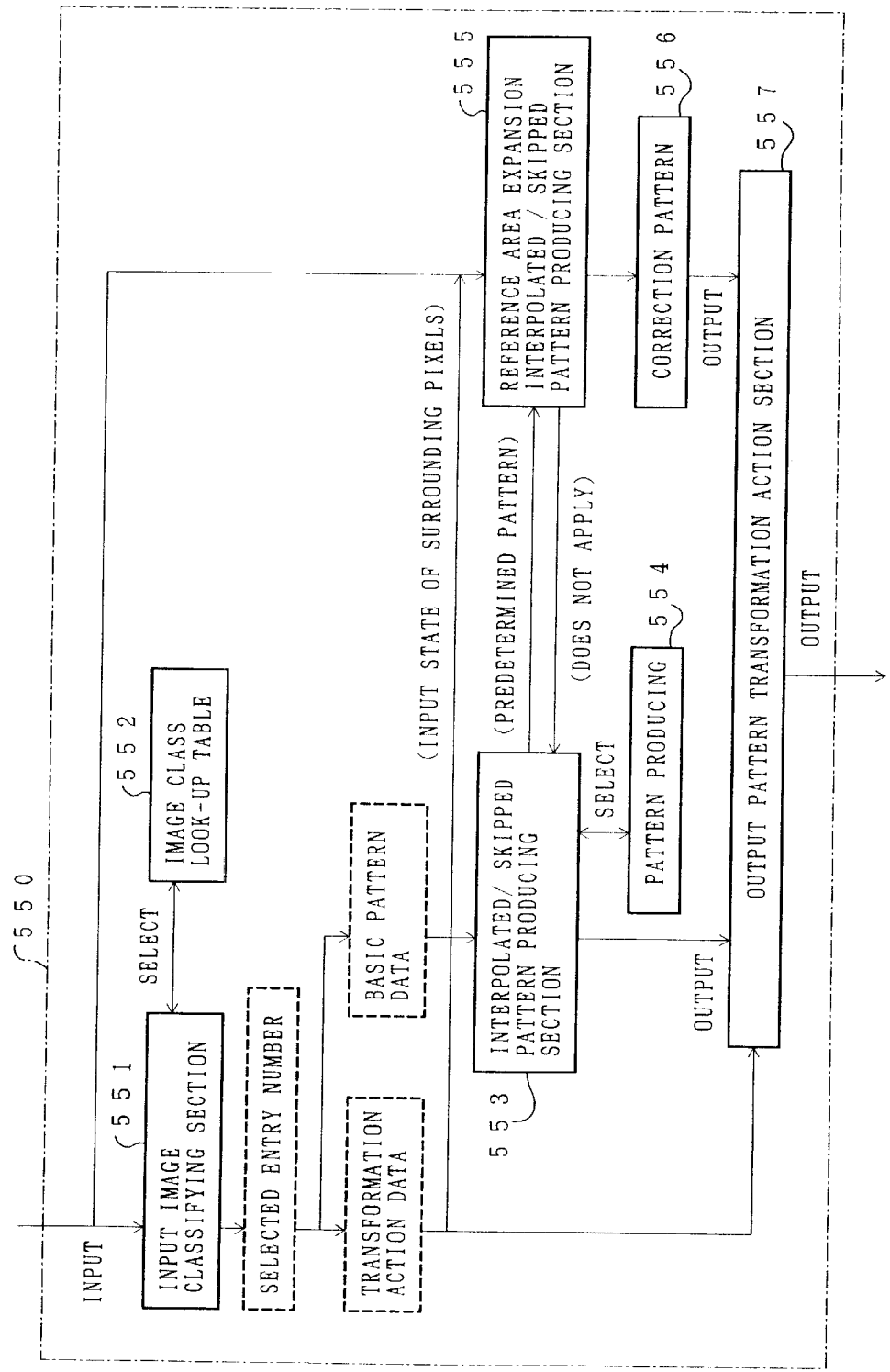
FIG. 20 is a block diagram showing the detailed structure of the foregoing pattern matching resolution conversion section.

As shown in FIG. 20, the pattern matching resolution conversion section 550 is made up of an input image classifying section 551, an image class look-up table 552, an interpolated/skipped pattern producing section 553 (pattern mask means and managing means), a pattern producing look-up table 554 (output pattern table), a reference area expansion interpolated/skipped pattern producing section 555, a correction pattern section 556, and an output pattern transformation action section 557.

The input image classifying section 551 classifies portions of the inputted image, expressed in terms of 512 types of input patterns, into 51 basic patterns shown in FIG. 23 (to be discussed below). The image class lookup table 522 is a look-up table in which are stored, as shown in FIG. 25 (to be discussed below), input pattern entries LUT of 512 types (entry numbers LUT0 through LUT511).

Figure 25:
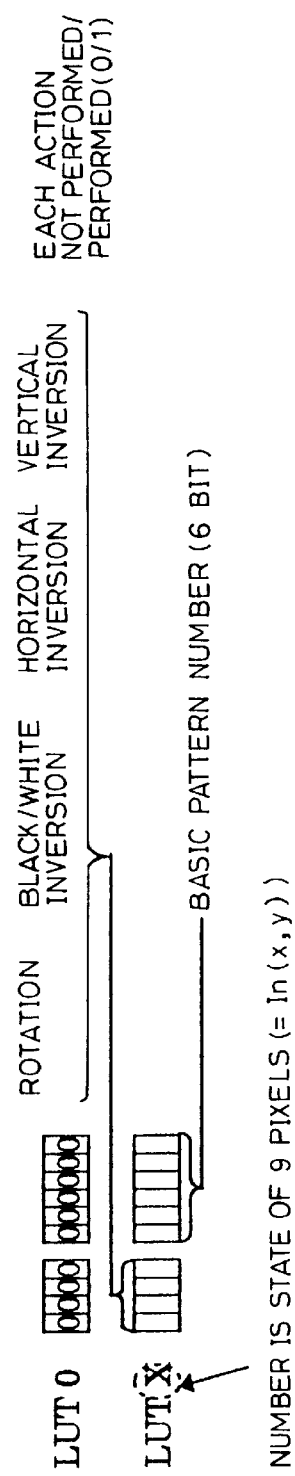
FIG. 25 is an explanatory drawing showing input pattern entries LUT in the foregoing resolution conversion or scaling.

For each portion of the inputted image, the input image classifying section 551 selects a table number from the image class look-up table 552, and outputs transformation action data (4 bits) and basic pattern data (6 bits), shown in FIG. 25, to the output pattern transformation action section 557, to the reference area expansion interpolated/skipped pattern producing section 555, and to the interpolated/skipped pattern producing section 553.

Figure 23:
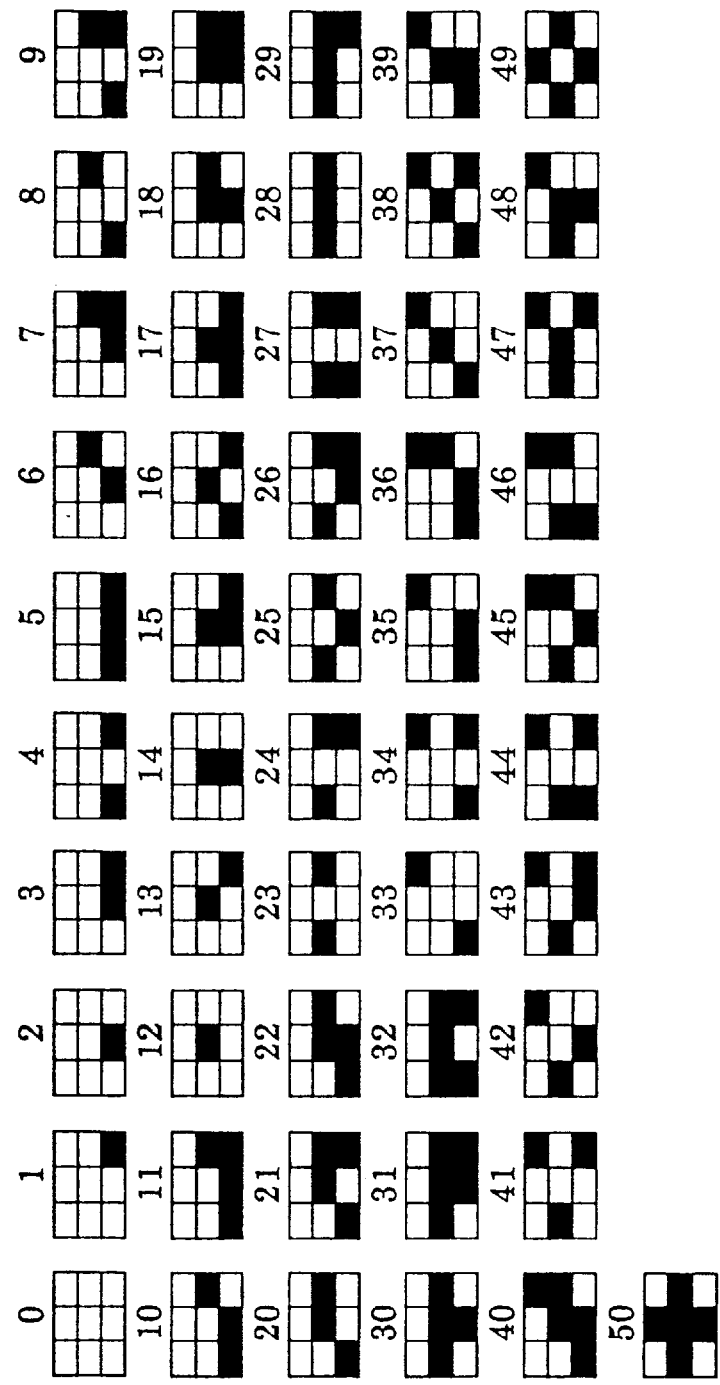
FIG. 23 is an explanatory drawing showing 51 basic patterns used in expressing 512 types of input pattern in the foregoing resolution conversion or scaling.
Figure 26:
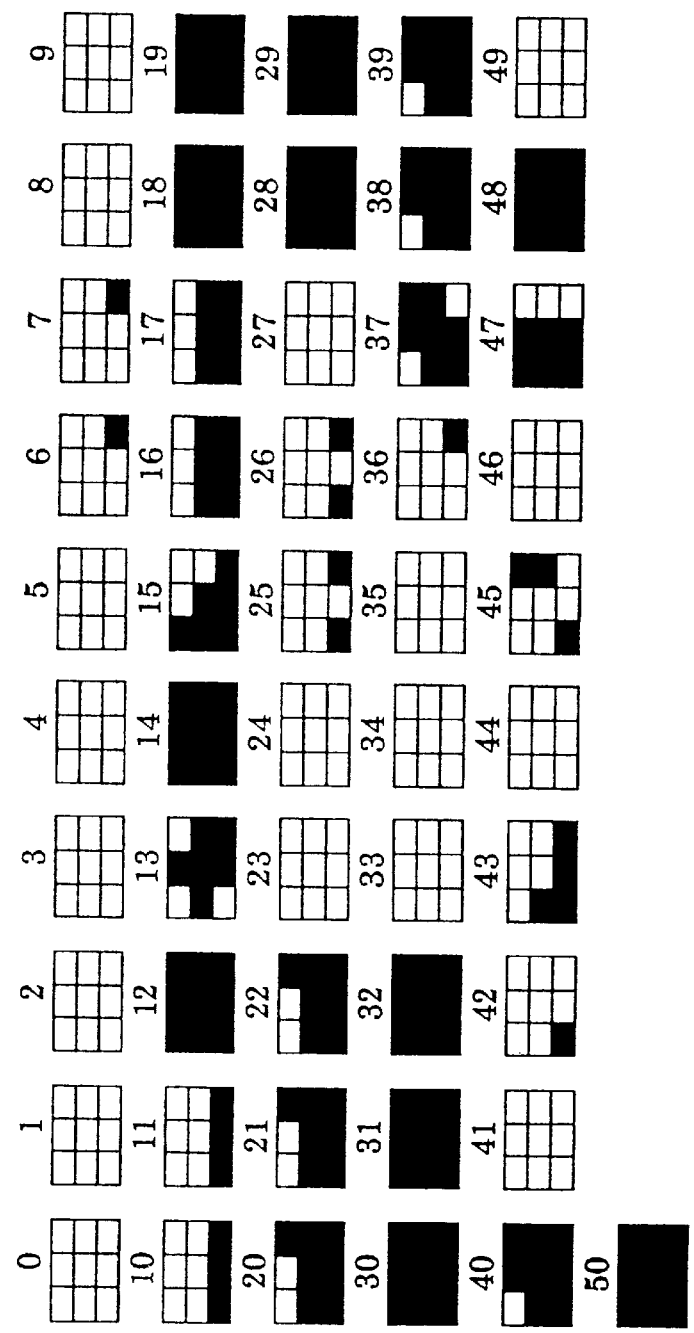
FIG. 26 is an explanatory drawing showing, in the foregoing resolution conversion or scaling, expanded patterns for each of the 51 basic patterns shown in FIG. 23, in which a pixel in question is expanded into 3×3 pixels.

Next, for each of the 51 basic patterns shown in FIG. 23, the interpolated/skipped pattern producing section 553 produces a pattern (as shown in FIG. 26 to be discussed below) by expanding a pixel in question into 3×3 pixels, and stores the patterns produced in the pattern producing look-up table 554.

When one of the basic patterns is inputted, the reference area expansion interpolated/skipped pattern producing section 555, as shown in FIGS. 27(*a*) through 27(*d*) and 28(*a*) through 28(*d*) (to be discussed below), outputs a correction pattern 556 for interpolation based on an expanded reference area of 7×3 pixels obtained, by combining the basic pattern with adjacent areas of 2×3 pixels to the left and right in the primary scanning direction (because the direction of adjoining black pixels is the primary scanning direction).

The output pattern transformation action section 557 determines an interpolation pixel pattern in accordance with changes such as horizontal or vertical inversion, black/white inversion, etc. of the mask, and performs interpolation of image data.

The following will explain resolution conversion of an inputted image in the pattern matching resolution conversion section 550 with the foregoing structure, such that each pixel thereof is expanded to 3×3 pixels, using as inputted image the image obtained in the first embodiment above by interpolating by two times in the secondary scanning direction.

1. INPUTTED IMAGE

The inputted image used is the image obtained in the first embodiment above by interpolating by two times in the secondary scanning direction.

2. REFERENCE TO PIXEL IN QUESTION AND SURROUNDING PIXELS

A pixel in question and surrounding pixels (3×3 pixels, or a total of 9 pixels) are inputted, and from these are found 3×3 pixels to be interpolated for the pixel in question.

Figure 21:
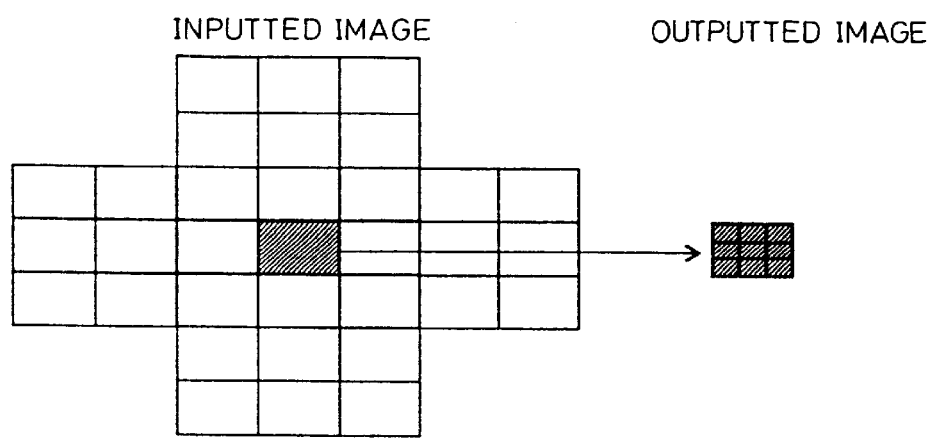
FIG. 21 is an explanatory drawing showing, in a resolution conversion or scaling method of the foregoing pattern matching resolution conversion section, operations for increasing resolution of an inputted image by three times in the primary scanning direction and three times in the secondary scanning direction.
Figure 22:
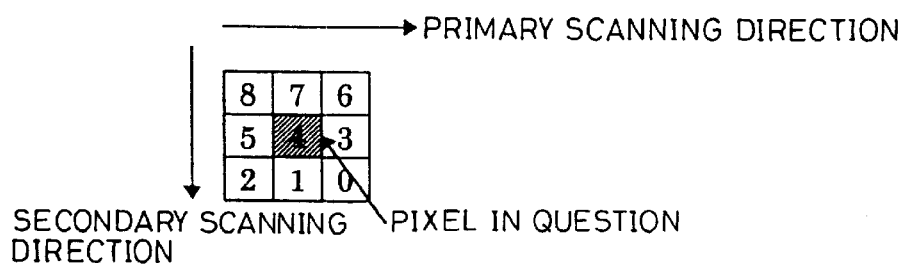
FIG. 22 is an explanatory drawing showing, in the foregoing resolution conversion or scaling, operations for expressing data of a pixel in question and surrounding pixels in 9 bits, with the state of pixels expressed as "0" for white pixels and as "1" for black pixels.

As shown in FIG. 21, resolution is to be three times greater in the primary scanning direction, and three times greater in the secondary scanning direction.

If the state of pixels is expressed as "0" for white pixels and as "1" for black pixels, the data of the pixel in question and the surrounding pixels can be expressed in 9 bits by lining up the 0/1 data for each pixel in the order 8, 7, 6, 5, 4, 3, 2, 1, 0. This 9-bit data will be referred to as In(x,y).

3. CLASSIFICATION OF STATE OF INPUT PIXELS

If, as discussed above, the data of the pixel in question and each of the surrounding pixels can be either 0 or 1, there are, for the 9 pixels, a total of 512 possible patterns. These 512 patterns can be expressed as transformations of a certain number of basic patterns, with, for example, a pattern of all black pixels being a black/white inversion of a basic pattern of all white pixels.

For example, if expressed in terms of combinations of vertical inversion, horizontal inversion, black/white inversion, and rotation (rotation 90° counter-clockwise), the 512 patterns can be expressed as transformations of 51 basic patterns.

Figure 24:
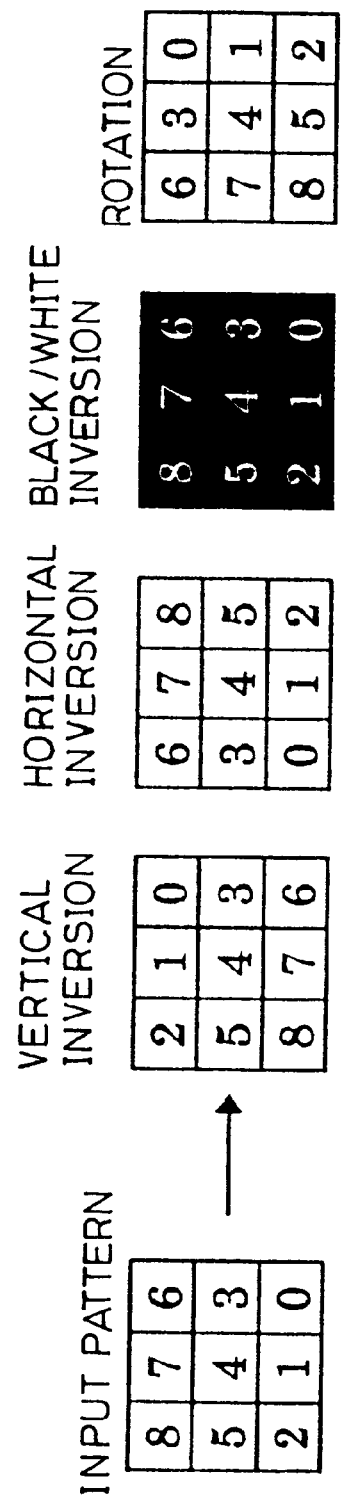
FIG. 24 is an explanatory drawing showing four transformation actions used in expressing 512 types of input pattern in the foregoing resolution conversion or scaling.

These basic patterns are shown in FIG. 23. The transformation actions are shown in FIG. 24, and are based on the coordinate system with the originating point in the upper left corner of the original image. Thus, the horizontal inversion action inverts a pattern horizontally, i.e., on the axis of the secondary scanning direction.

The vertical inversion action inverts a pattern vertically, i.e., on the axis of the primary scanning direction.

The black/white inversion action does not change the positions of the pixels of a pattern, but inverts the density of each of the pixels, i.e., white pixels are inverted to black pixels, and black pixels are inverted to white pixels.

The rotation action rotates a pattern 90° counter-clockwise around the central pixel (position 4 in FIG. 24).

By performing one or a combination of the foregoing transformation actions on the 51 basic patterns, all of the 512 possible input patterns can be expressed.

Incidentally, it is possible to express the 512 input patterns in terms of a group of basic patterns and combinations of transformation actions differing from those of the present embodiment.

In the following explanation, interpolation of the inputted image will be performed on the basis of combinations of the foregoing basic patterns and transformation actions.

First, numbers 0 through 50 are assigned to the 51 basic patterns, and these numbers are expressed as 6-bit binary numbers 000000 through 110010.

Then, by expressing the presence or absence of each transformation action as 1 or 0, respectively, the transformation action(s) performed are expressed in 4 bits, in the order rotation, black/white inversion, horizontal inversion, vertical inversion. Thus, 1000 indicates that only rotation is performed.

Further, the states of the pixel in question and the surrounding pixels In(x,y), as discussed above, are expressed by a 9-digit value of 000000000 through 111111111, and these values are used as the numbers of the 512 possible input patterns.

In this way, by using the values of In(x,y) as entry numbers of input pattern entries LUT (entry numbers LUT0 through LUT511), each of which stores, for the entry number, the corresponding basic pattern number and the transformation actions performed thereon, the image class look-up table 552 can be prepared. Using the image class look-up table 552, the state of any inputted pattern of 9 pixels (In(x,y)) can be used to look up the corresponding basic pattern and the transformation action(s) to perform thereon to obtain the inputted pattern.

As shown in FIG. 25, the image class look-up table 552 stores input pattern entries LUT, each comprising an entry number LUTX (LUT0 through LUT511) expressing the 9-bit state of the input pattern (In(x,y)), followed by 4 bits expressing the transformation action(s) to be performed, and 6 bits expressing the basic pattern number.

4. DETERMINING PATTERN TO BE INTERPOLATED FOR INPUT PATTERN

FIG. 26 shows examples of patterns obtained by expansion into 3×3 pixels of the pixel in question (center pixel) of each basic pattern.

The expanded patterns shown in FIG. 26 have a one-to-one correspondence with the basic patterns of FIG. 23. A pattern producing look-up table 554 is prepared which stores each expanded pattern as 9-bit data in which white pixels=0 and black pixels=1. In the pattern producing look-up table 554, the entry numbers are the basic pattern numbers of the basic patterns corresponding to the respective expanded patterns.

5. EXPANSION OF REFERENCE AREA IN ACCORDANCE WITH INPUT PATTERN

For example, assume that patterns equivalent to basic pattern No. 5 and basic pattern No. 28 shown in FIG. 23 are inputted. In both cases, it is likely that the pixel in question and the surrounding pixels are in the midst of an edge. At this time, in order to refer to more pixels in the vicinity, the mask size is expanded into 3×7 or 7×3 pixels, and the data of the pixel in question and the surrounding pixels in this expanded reference area is obtained.

In this way, an incline of the edge can be detected, and an interpolation pattern of 3×3 pixels can be determined in accordance with the detected result. Thus interpolation can be performed giving consideration to the state of the original image, which contributes to further improvement in image quality.

Incidentally, at this time, as well, data regarding the basic pattern and the transformation actions to perform to obtain a given inputted pattern can be obtained from the central 3×3 pixels of the inputted pattern.

The following will explain interpolation made on the basis of the input pattern.

First, if a pattern equivalent to basic pattern No. 5 shown in FIG. 23 is inputted, it is determined by how much inclines the edge to which belong the three black pixels of the line below the line of the pixel in question.

At this time, as shown in FIGS. 27(a) and 27(b), an expanded area of 7×3 pixels is referred to, which is obtained by combining the inputted pattern No. 5 with adjacent areas of 2×3 pixels to the left and right in the primary scanning direction (because the direction of the adjoining black pixels is the primary scanning direction). Then, when the reference area is in the midst or at the end of an edge, the positional relationship and angle of incline of the edge with respect to the reference area are determined.

When the input pattern is equivalent to a basic pattern transformed by one or more of the transformation actions, for example, when the data expressing the input pattern indicates that the input pattern is basic pattern No. 5 rotated, the expanded reference area is of 3×7 pixels, obtained by combining the 3×3 pixel input pattern with adjacent areas of 3×2 pixels above and below in the secondary scanning direction. This is because, in this input pattern (basic pattern No. 5 rotated), the direction of the three adjoining black pixels (the edge) is the secondary scanning direction instead of the primary scanning direction, as it was in the case of the foregoing input pattern equivalent to basic pattern No. 5.

In other words, when determining a correction pattern on the basis of the expanded reference area, the correction pattern is selected by referring to the data indicating the basic pattern and the transformation action(s) performed thereon to produce the input pattern, and by referring to a reference area of 3×7 or 7×3 pixels obtained, on the basis of the foregoing data, by combining the input pattern with adjacent areas of 2×3 or 3×2 pixels. As a result, by transforming the selected correction pattern in accordance with the transformation action data, a pixel pattern for interpolation can be determined.

In determining a correction pattern based on the relationship with surrounding pixels, when the input pattern is equivalent to basic pattern No. 5 shown in FIG. 23, i.e., when the state of the pixels of the input pattern is as shown in FIG. 27(*a*) or is the same horizontally inverted, the reference area is expanded as shown in FIG. 27(*b*), yielding arrangements of the surrounding pixels such as those shown in FIGS. 27(*c*) and 27(*d*). In both FIG. 27(*c*) and FIG. 27(*d*), the input pattern is in the midst of an incline, but, according to the differing arrangements of surrounding pixels shown in the two Figures, a different correction pattern is interpolated for the pixel in question. When the foregoing correction based on an expanded reference area of 3×7 or 7×3 pixels cannot be applied, the correction pattern is selected, as explained in 4 above, from the 3×3 pixel input pattern, i.e., for basic pattern No. 5, correction pattern No. 5 shown in FIG. 26 is interpolated for the pixel in question.

Next, in determining a correction pattern based on the relationship with surrounding pixels, when the input pattern is equivalent to basic pattern No. 28 shown in FIG. 23, i.e., when the state of the pixels of the input pattern is as shown in FIG. 28(*a*) or is the same horizontally inverted, the reference area is expanded as shown in FIG. 28(*b*), yielding arrangements of the surrounding pixels such as those shown in FIGS. 28(*c*) and 28(*d*). In both FIG. 27(*c*) and FIG. 27(*d*), the input pattern is in the midst of an incline, but, according to the differing arrangements of surrounding pixels shown in the two Figures, a different correction pattern is interpolated for the pixel in question. When the foregoing correction based on an expanded reference area of 3×7 or 7×3 pixels cannot be applied, the correction pattern is selected, as explained in 4 above, from the 3×3 pixel input pattern, i.e., for basic pattern No. 28, correction pattern No. 28 shown in FIG. 26 is interpolated for the pixel in question.

By the method explained above, interpolation can be performed to expand each pixel of the inputted image into 3×3 pixels.

6. REGARDING THE INPUTTED IMAGE

In the present embodiment, the inputted image is an image which has been interpolated by two times in the secondary scanning direction.

Here, in expanding each inputted pixel to 3×3 pixels, since the mask size for determining whether an input pattern is in the midst of an inclined edge is 7×3 or 3×7 pixels, only edge lengths of up to 7 pixels can be detected.

Further, in the present embodiment, since the edge lengths of edges judged to be in the midst of an incline are from 3 pixels to 5 pixels, edge length detection and correction at the time of preparing the inputted image also set limit values in keeping therewith. For example, an edge over 15 pixels in length is detected as an edge with an edge lengths of 15 pixels. Even if the image is interpolated by two times in the secondary scanning direction after setting such limit values, there is no great impairment of the image quality ultimately obtained.

As discussed above, in the digital copy machine 30 according to the present embodiment, resolution conversion or scaling by detecting lengths and shapes of edges, performed by the edge detecting section 520 and the interpolated/skipped line section 530, is combined, in the pattern matching resolution conversion section 550, with resolution conversion or scaling by means of a pattern matching mask, performed by the interpolated/skipped pattern producing section 553. Consequently, a wide range of resolution conversion rates or scaling rates can be used.

As a result, even finer edges can be made smooth.

Further, in the digital copy machine 30 according to the present embodiment, the interpolated/skipped pattern producing section 553 first detects patterns with a fairly small pattern matching mask, and then changes the shape of the mask and performs pattern detection.

Consequently, by first detecting patterns using a fairly small pattern matching mask, and then, if necessary, changing the shape of the mask and performing pattern detection, a precise, high-speed, and inexpensive hardware structure can be realized.

Further, when detecting using the small mask, managing means express detected patterns in terms of a number of element patterns and transformation actions performed thereon. Consequently, it is possible to reduce the quantity of data in the output pattern table.

Accordingly, it is possible to output a very large number of patterns with a high-speed, inexpensive hardware structure.

Further, in the digital copy machine 30 according to the present embodiment, since the transformation actions are expressed in terms of vertical inversion, horizontal inversion, black/white inversion, rotation, and combinations of the foregoing, the number of output patterns and the data quantity of the pattern producing look-up table 554 can be reduced easily and with certainty.

Accordingly, it is possible to output with certainty a very large number of patterns with a high-speed, inexpensive hardware structure.

Further, in the digital copy machine 30 according to the present embodiment, the interpolated/skipped pattern producing section 553 first detects patterns with a small pattern matching mask, and then changes the shape of the mask and performs pattern detection.

Here, after first detecting patterns using a small pattern matching mask, the shape of the mask is changed, if necessary. When the shape of the mask is changed in order to perform detecting, the mask is not square.

Consequently, algorithms can be simplified, and it is possible to reduce the cost of the hardware structure.

Further, in the digital copy machine 30 according to the present embodiment, when changing the shape of the mask using the element patterns and the transformation actions, the reference area is limited.

Consequently, the change of the mask shape can be limited to a portion for which detecting is to be performed, and thus data quantities not usually detectable can be processed using simple algorithms and in a low-cost hardware structure.

Further, in the digital copy machine 30 according to the present embodiment, the pattern matching resolution conversion section 550, in view of the rate of resolution conversion or scaling by pattern matching, sets a limit value for edge length, and when an edge length exceeds the limit value, judges the length of the edge to be equal to the limit value.

Accordingly, when performing resolution conversion or scaling by combining edge length and shape detection and pattern matching detection, by setting a limit value for edge length in accordance with the resolution conversion rate or scaling rate, a high-speed and simple hardware can be used.

Further, in the digital copy machine 30 according to the present embodiment, when the pattern matching resolution conversion section 550 performs resolution conversion or scaling by combining edge length and shape detection and pattern matching detection, the combination is determined in accordance with the resolution conversion rate or scaling rate in the primary scanning direction or the secondary scanning direction. Consequently, even more suitable image quality, especially with regard to inclined lines of shallow angle, can be obtained.

Incidentally, in the foregoing pattern matching, resolution conversion or scaling is not necessarily increase of the number of pixels by interpolation. For example, depending on the pattern sizes and arrangements of input and output, it is also possible to perform reduction, i.e., skipping of pixels.

As discussed above, the pattern mask means of the image forming device according to the present invention first detects patterns using a small pattern matching mask, and then changes the shape of the mask and detects patterns; and the image forming device is preferably further provided with managing means, which express detected patterns detected using the small pattern mask in terms of a number of element patterns and transformation actions thereof and determine patterns corresponding to the detected patterns, thereby reducing the data quantity of an output pattern table.

With this structure, the pattern mask means first detect patterns using a fairly small pattern matching mask, and then change the shape of the mask and detect patterns.

Further, when detecting patterns using the small mask, in the managing means, by expressing the detected patterns in terms of a number of element patterns and transformation actions thereof, reduction of the data quantity of the output pattern table can be realized.

Accordingly, it becomes possible to output a very large number of patterns at high speed and using a low-cost hardware structure.

Further, in the image forming device according to the present invention, it is preferable to perform the transformation actions by means of vertical inversion, horizontal inversion, black/white inversion, rotation, and their combinations.

With this structure, by expressing the transformation actions in terms of vertical inversion, horizontal inversion, black/white inversion, rotation, and their combinations, it becomes possible to realize reduction of the data quantity of the output pattern table easily and with certainty.

Accordingly, it is possible to output, with certainty, a very large number of patterns using a high-speed, low-cost hardware structure.

Third Embodiment

The following will explain a further embodiment of the present invention. For ease of explanation, members having the same functions as those shown in the drawings pertaining to the first embodiment above will be given the same reference symbols, and explanation thereof will be omitted here.

In a device, such as a facsimile transmitting and receiving device, which receives images having various resolutions, and which is provided with a writing system having a fixed resolution, by performing resolution conversion of a received image in accordance with the receiving resolution, so as to bring it into conformity with the resolution of the writing system, output can be obtained which is the same size as the image at the time of transmission.

At this time, by switching, according to the resolution of the inputted image, between processing paths of the first and second embodiments above, it is possible to perform resolution interpolation or skipping to obtain a fixed resolution.

In other words, a plurality of resolutions are used, including 203.2 dpi×97.8 dpi (hereinafter referred to as "standard resolution"), 203.2 dpi×195.6 dpi (hereinafter referred to as "fine resolution"), etc.

Here, assume that an image A of standard resolution (203.2 dpi in the primary scanning direction and 97.9 dpi in the secondary scanning direction) and an image B of fine resolution (203.2 dpi in the primary scanning direction and 195.6 dpi in the secondary scanning direction) are inputted into a device C.

The device C is provided with a processing stage for the foregoing interpolation or skipping.

When the image A is inputted, it is interpolated by two times in the secondary scanning direction, and then each pixel thereof is expanded to 3×3 pixels by means of pattern matching. The resolution of the output image obtained hereby is 609.6 dpi in the primary scanning direction and 586.8 dpi in the secondary scanning direction.

Next, when the image B is inputted, interpolation by two times in the secondary scanning direction is not performed, but each pixel of the image B is expanded to 3×3 pixels by means of pattern matching. The resolution of the output image obtained hereby is 609.6 dpi in the primary scanning direction and 586.8 dpi in the secondary scanning direction.

Accordingly, by switching the processing path of interpolation or skipping, images inputted at different resolutions can be resolution converted to the same resolution, thus obtaining output images of the same resolution.

The foregoing will now be explained simply.

For example, since a facsimile is 200 dpi×100 dpi or 200 dpi×200 dpi, if a printer is 600 dpi×600 dpi, it is necessary to perform resolution conversion to three times the initial resolution both vertically and horizontally. Incidentally, in the 200 dpi×100 dpi mode, the 100 dpi direction is first resolution-converted to twice the initial resolution.

In digital scaling, setting the enlargement rate as high as 300% produces pronounced unevenness, i.e., jaggedness, and thus the importance of smoothing processing is great.

For example, if, examining the original image using a 3×3 mask, a pattern equivalent to basic pattern No. 5 shown in FIG. 23 is found, the central pixel of the 3×3 mask is expanded to expanded pattern No. 5 shown in FIG. 26. In other words, since resolution is increased by three times, a 3×3 pixel pattern is assigned to a single pixel. Further, since the central pixel of basic pattern No. 5 shown in FIG. 23 is a white pixel, all of the pixels of expanded pattern No. 5 are white pixels.

Again, if, using the 3×3 pixel mask, a pattern equivalent to basic pattern No. 37 shown in FIG. 23 is found, the central pixel thereof is expanded to expanded pattern No. 37 shown in FIG. 26. In other words, since basic pattern No. 37 shown in FIG. 23 shows a diagonal line, expanded pattern No. 37 shown in FIG. 26 also shows a diagonal line.

In order to further improve the foregoing resolution conversion, if, using the 3×3 pixel mask, patterns equivalent to basic patterns No. 5 and No. 28 are found, the mask is expanded to a 3×7 pixel (or 7×3 pixel) mask, as shown in FIGS. 27(a) and 27(b) and 28(a) and 28(b), respectively, and adjacent pixels to the left and right (or above and below) the initial 3×3 pixel mask are examined. When the pattern of the expanded mask is a predetermined pattern, the expanded pattern to be applied to the central pixel is changed.

As a result, in case of the input pattern equivalent to basic pattern No. 5 shown in FIG. 23, the correction pattern shown in FIGS. 27(c) and 27(d) is outputted for the central pixel. Again, in the case of the input pattern equivalent to basic pattern No. 28 shown in FIG. 23, the correction pattern shown in FIGS. 28(c) and 28(d) is outputted for the central pixel.

In this way, in the digital copy machine 30 according to the present embodiment, in a device like a facsimile transmitting and receiving device, which receives images having various resolutions, and which is provided with a writing system having a fixed resolution, by performing resolution conversion of a received image in accordance with the receiving resolution, so as to bring it into conformity with the resolution of the writing system, output can be obtained which is the same size as the image at the time of transmission.

The embodiments and concrete examples of implementation discussed in the foregoing detailed explanation of the present invention serve solely to illustrate the technical contents of the present invention, which should not be narrowly interpreted within the limits of such concrete examples, but rather may be applied in many variations without departing from the spirit of the present invention and the scope of the patent claims set forth below.

What is claimed is:

1. An image forming device comprising:

edge detecting means, which detect length and shape of an edge of a binary image; and interpolating means, which, based on the length and shape of the edge detected by said edge detecting means, perform resolution conversion processing or scaling processing of the binary image;

wherein said edge detecting means detect the length and shape of the edge by comparing a given pixel with other pixels of a line parallel to a primary scanning direction to which the given pixel belongs, moving from the given pixel in each direction along the line.

2. The image forming device set forth in claim 1, wherein:

said edge detecting means detects the length and shape of the edge by comparing the given pixel, belonging to the line parallel to the primary scanning direction, with a pixel of an adjacent line parallel to the primary scanning direction.

3. The image forming device set forth in claim 1, wherein: the shape of the edge is detected based on a state of the edge, the length of the edge, and a state of a pixel adjacent to an end of the edge.

4. The image forming device set forth in claim 1, wherein: said edge detecting means detect the shape of the edge as one of: descending to the left, descending to the right, indented, and flat; and when performing resolution conversion processing or scaling processing, said interpolating means perform interpolation or skipping of a pixel in accordance with the shape of the edge detected by said edge detecting means.

5. The image forming device set forth in claim 4, wherein:

when performing resolution conversion processing or scaling processing, said interpolating means perform interpolation or skipping of a pixel based on whether an end of the edge detected by said edge detecting means is an end of an incline or is in the midst of an incline.

6. An image forming device comprising:

edge detecting means, which detect an edge of a binary image, and detect length and shape of the edge;

interpolating means, which, based on the length and shape of the edge detected by said edge detecting means, perform resolution conversion processing or scaling processing of the binary image;

pattern mask means, which perform resolution conversion processing or scaling processing of the binary image by means of a pattern matching mask; and combining means, which process and combine the resolution conversion processing or scaling processing of the binary image performed by said interpolating means and the resolution conversion processing or scaling processing of the binary image performed by said pattern mask means.

7. The image forming device set forth in claim 6, wherein:

said pattern mask means first detect patterns using a first pattern matching mask, and then, as necessary, detect patterns by expanding a reference area using a second pattern matching mask larger in size than the first pattern matching mask.

8. The image forming device set forth in claim 7, further comprising:

managing means, which express the patterns detected using the first pattern matching mask in terms of a number of element patterns and transformation actions thereof, thereby reducing data quantity of an output pattern table which stores output patterns corresponding to the detected patterns.

9. The image forming device set forth in claim 8, wherein:

the transformation actions are performed by means of actions of: vertical inversion, horizontal inversion, black/white inversion, rotation, and their combinations.

10. The image forming device set forth in claim 7, wherein:

the second pattern matching mask is not square.

11. The image forming device set forth in claim 6, wherein:

in accordance with a resolution conversion rate of resolution conversion processing or a scaling rate of scaling processing of the binary image performed by said pattern mask means, said combining means set a limit value for edge length, and when an edge length exceeds the limit value, judge the edge length to be equal to the limit value.

12. The image forming device set forth in claim 6, wherein:

said combining means combine the resolution conversion processing or scaling processing performed by said interpolating means and the resolution conversion processing or scaling processing performed by said pattern mask means in accordance with resolution conversion rates or scaling rates in a primary scanning direction and in a secondary scanning direction perpendicular to the primary scanning direction.

13. The image forming device set forth in claim 6, wherein:

said edge detecting means detect the length and shape of the edge by comparing a given pixel, belonging to a line parallel to a primary scanning direction, with a pixel of an adjacent line parallel to the primary scanning direction.

14. The image forming device set forth in claim 13, wherein:

said edge detecting means detect the length and shape of the edge by comparing the given pixel with other pixels of the line parallel to the primary scanning direction to which the given pixel belongs, moving from the given pixel in each direction along the line.

15. The image forming device set forth in claim 14, wherein:

the shape of the edge is detected based on a state of the edge, the length of the edge, and a state of a pixel adjacent to an end of the edge.

16. The image forming device set forth in claim 6, wherein:

said edge detecting means detect the shape of the edge as one of: descending to the left, descending to the right, indented, and flat; and when performing resolution conversion processing or scaling processing, said interpolating means perform interpolation or skipping of a pixel in accordance with the shape of the edge detected by said edge detecting means.

17. The image forming device set forth in claim 16, wherein:

when performing resolution conversion processing or scaling processing, said interpolating means perform interpolation or skipping of a pixel based on whether an end of the edge detected by said edge detecting means is an end of an incline or is in the midst of an incline.

18. An image forming device comprising:

edge detecting means, which, during resolution conversion or scaling of a binary image, detect an edge of an image, and detect length and shape of the edge; and interpolating means, which, based on the length and shape of the edge detected by said edge detecting means, perform resolution conversion processing or scaling processing;

wherein in detecting the edge of the image and the length and shape of the edge, said edge detecting means detect a state of the edge by comparing a given pixel, belonging to a line parallel to a primary scanning direction, with a pixel of an adjacent line parallel to the primary scanning direction, and find a position of an end of the edge and the length of the edge by performing the comparison moving from the given pixel in each direction along the lines.

19. The image forming device set forth in claim 18, wherein:

said edge detecting means detect the shape of the edge as one of: descending to the left, descending to the right, and indented; and in performing resolution conversion or scaling, said interpolating means change a method of interpolating or skipping a pixel in accordance with the shape of the edge detected by said edge detecting means.

20. The image forming device set forth in claim 18, wherein:

in interpolating or skipping pixels, said interpolating means change a correction method if a state of an end of the edge is determined to be an end of an incline or an indentation.

21. An image forming device comprising:

edge detecting means, which, during resolution conversion or scaling of a binary image, detect an edge of an image, and detect length and shape of the edge;

interpolating means, which, based on the length and shape of the edge detected by said edge detecting means, perform resolution conversion processing or scaling processing;

pattern mask means, which perform resolution conversion processing or scaling processing by means of a pattern matching mask; and combining means, which process and combine the resolution conversion processing or scaling processing performed by said interpolating means and the resolution conversion processing or scaling processing performed by said pattern mask means.

22. The image forming device set forth in claim 21, wherein:

said pattern mask means first detect patterns using a small pattern matching mask, and then change a shape of the pattern matching mask and detect patterns; and said image forming device further comprises managing means, which express the patterns detected using the small pattern matching mask in terms of a number of element patterns and transformation actions thereof, and determine patterns corresponding to the detected patterns, thereby reducing data quantity of. an output pattern table.

23. The image forming device set forth in claim 21, wherein:

the transformation actions are performed by means of actions of: vertical inversion, horizonal inversion, black/white inversion, rotation, and their combinations.

* * * * *